(12) United States Patent
Kasai et al.

(10) Patent No.: US 10,847,826 B2
(45) Date of Patent: Nov. 24, 2020

(54) POLYMER ELECTROLYTE FUEL CELLS AND PRODUCTION METHOD THEREOF

(71) Applicant: Panasonic Intellectual Property Management Co., Ltd., Osaka (JP)

(72) Inventors: Yoko Kasai, Osaka (JP); Tsutomu Kawashima, Nara (JP); Miyuki Yoshimoto, Osaka (JP); Yoshifumi Taguchi, Osaka (JP); Hiroaki Suzuki, Osaka (JP); Shinichiro Imura, Hyogo (JP)

(73) Assignee: Panasonic Intelletual Property Management Co., Ltd., Osaka (JP)

( * ) Notice: Subject to any disclaimer, the term of this patent is extended or adjusted under 35 U.S.C. 154(b) by 239 days.

(21) Appl. No.: 15/886,816

(22) Filed: Feb. 1, 2018

(65) Prior Publication Data
US 2018/0233760 A1    Aug. 16, 2018

(30) Foreign Application Priority Data
Feb. 16, 2017   (JP) ................................. 2017-027139
Nov. 10, 2017   (JP) ................................. 2017-216851

(51) Int. Cl.
*H01M 8/1018*   (2016.01)
*H01M 8/0273*   (2016.01)
(Continued)

(52) U.S. Cl.
CPC ....... *H01M 8/1018* (2013.01); *H01M 2/1673* (2013.01); *H01M 8/0273* (2013.01);
(Continued)

(58) Field of Classification Search
CPC ............. H01M 8/1018; H01M 8/0273; H01M 8/1004; H01M 8/026; H01M 2/1673
See application file for complete search history.

(56) References Cited

U.S. PATENT DOCUMENTS

2003/0104262 A1\* 6/2003 Kuroki ................ H01M 8/0276
                                                          429/510
2009/0246586 A1\* 10/2009 Kawabata ............. H01M 4/886
                                                          429/483
(Continued)

FOREIGN PATENT DOCUMENTS

JP        2008-177001        7/2008
JP        2016-103390        6/2016

*Primary Examiner* — Jimmy Vo
(74) *Attorney, Agent, or Firm* — Wenderoth, Lind & Ponack, L.L.P.

(57) ABSTRACT

A fuel cell includes: an electrolyte membrane; a fuel-side catalyst layer placed on one surface of the electrolyte membrane; an oxidant-side catalyst layer placed on another surface of the electrolyte membrane; a fuel-side gas-diffusion layer placed on a main surface of the fuel-side catalyst layer; an oxidant-side gas-diffusion layer placed on a main surface of the oxidant-side catalyst layer; a pair of separators that hold the fuel-side gas-diffusion layer and the oxidant-side gas-diffusion layer therebetween; a frame that surrounds outer peripheries of the fuel-side gas-diffusion layer and the oxidant-side gas diffusion layer; a fuel-side seal member placed on a main surface of the fuel-side gas-diffusion layer; and an oxidant-side seal member placed on a main surface of the oxidant-side gas-diffusion layer. In the fuel cell, no spaces are provided between the fuel-side gas-diffusion layer and the fuel-side catalyst layer and between the oxidant-side gas-diffusion layer and the oxidant-side catalyst layer.

12 Claims, 19 Drawing Sheets

(51) Int. Cl.
*H01M 8/1004* (2016.01)
*H01M 2/16* (2006.01)
*H01M 8/026* (2016.01)

(52) U.S. Cl.
CPC .......... *H01M 8/1004* (2013.01); *H01M 8/026* (2013.01); *H01M 2008/1095* (2013.01); *H01M 2300/0082* (2013.01); *Y02E 60/50* (2013.01); *Y02P 70/50* (2015.11)

(56) References Cited

U.S. PATENT DOCUMENTS

| | | | | |
|---|---|---|---|---|
| 2015/0010846 A1* | 1/2015 | Horibe | ................ | H01M 8/0273 429/480 |
| 2015/0072264 A1* | 3/2015 | Yaginuma | ........... | H01M 8/0232 429/480 |

* cited by examiner

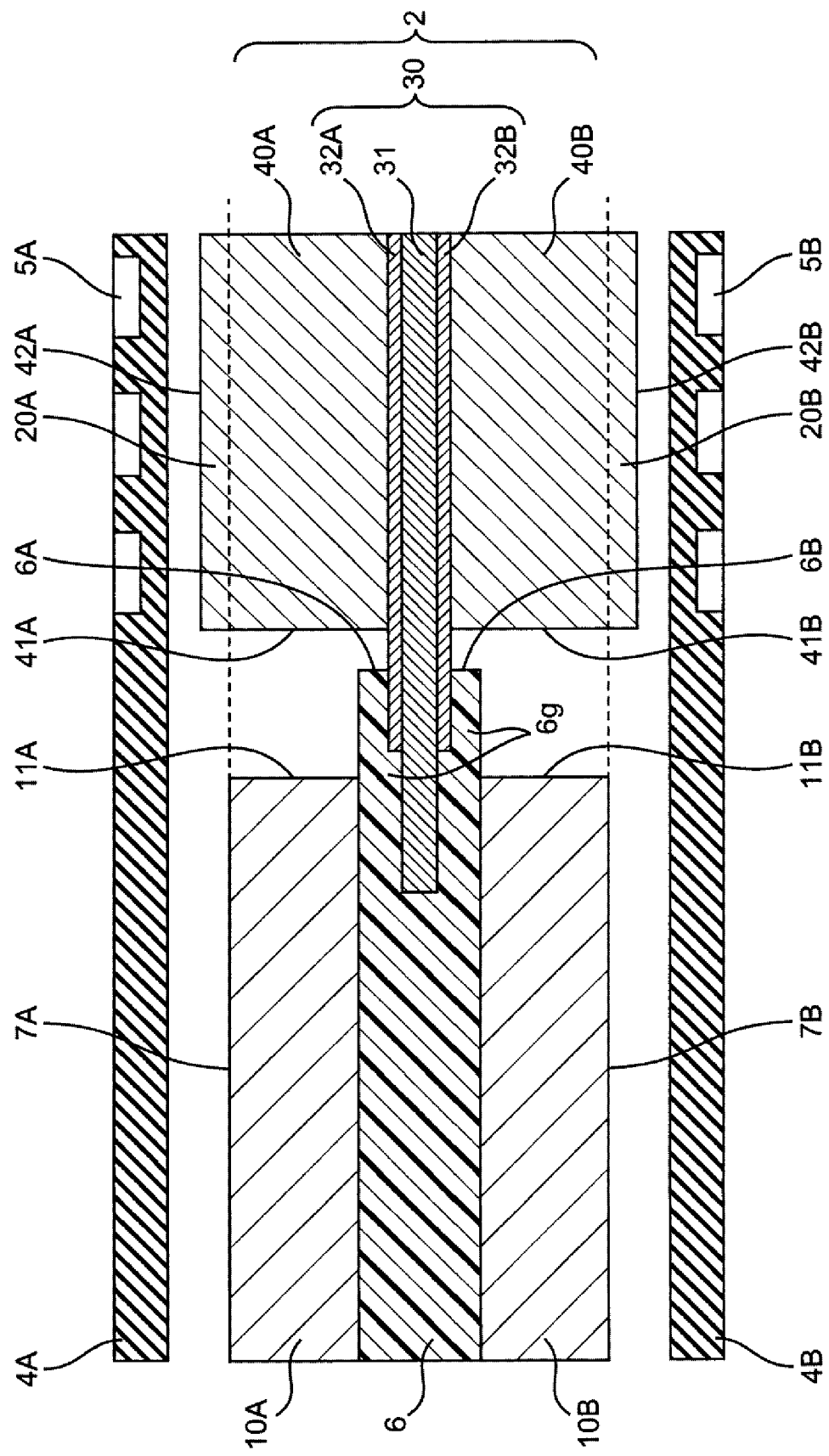

POLYMER ELECTROLYTE FUEL CELLS AND PRODUCTION METHOD THEREOF

TECHNICAL FIELD

The technical field relates to polymer electrolyte fuel cells and production method thereof.

BACKGROUND

In fuel cells, fuel gases containing hydrogen, and oxidant gases containing oxygen (e.g., the air) are electrochemically reacted with one another.

Accordingly, the fuel cells simultaneously produce electric power and heat.

FIG. 8 is an exploded perspective view that shows a basic structure of a unit cell in a polymer electrolyte fuel cell that is one form of a conventional fuel cell.

Basically, the unit cell includes: a polymer electrolyte membrane 201 that selectively transports hydrogen ions therethrough; and a pair of electrodes (i.e., an anode 206 and a cathode 207) that are formed on both sides of the polymer electrolyte membrane 201.

The anode 206 and cathode 207 contain carbon powders carrying platinum-group catalysts as main components. The anode 206 includes: a fuel-side catalyst layer 202 that is formed on a surface of the polymer electrolyte membrane 201; and a fuel-side catalyst layer 204 that is placed on an outer surface of the fuel-side catalyst layer 202 and that combines air permeability and electron conductance. In the same manner, the cathode 207 includes: an oxidant-side catalyst layer 203 that is formed on another surface of the polymer electrolyte membrane 201; and an oxidant-side catalyst layer 205 that is placed on an outer surface of the oxidant-side catalyst layer 203 and that also combines air permeability and electron conductance.

The pair of the polymer electrolyte membrane 201 and the fuel-side catalyst layer 202 or the oxidant-side catalyst layer 203 is called a catalyst coated membrane (CCM) (hereinafter, referred to as "CCM").

In order to prevent outside leakage of gases supplied to the fuel-side catalyst layer 202 and the oxidant-side catalyst layer 203, and mixture of the fuel gas and the oxidant gas, a frame 211 is provided around the anode 206 and the cathode 207 so as to hold the electrolyte membrane 201.

A combination structure in which the CCM with the outer edge surrounded by the frame 211 is combined with the fuel-side gas-diffusion layer 204 and the oxidant-side gas-diffusion layer 205 is called an electrolyte membrane electrode assembly 212 (hereinafter, referred to as "MEA").

Conductive separators 210 are placed on both sides of the MEA 212 so as to mechanically fix the MEA 212 between these members, and so as to connect adjacent MEAs 212 electrically in series.

Fuel-side flow channel grooves 208, and oxidant-side flow channel grooves 209 may be formed on areas of the respective separators 210 that come into contact with the MEA 212. The fuel-side flow channel grooves 208 and the oxidant-side flow channel grooves 209 supply the fuel gas and a reaction gas such as an oxidant gas to the anode 206 and the cathode 207, respectively, and carry produced water or surplus gases away therefrom.

The MEA 212 is a minimum unit having a power generation function, and forms a unit cell module when it is placed between the pair of separators 210.

For materials of separators 210, materials having excellent corrosion resistance are suitable, and, for example, stainless steel can be used.

An MEA having a gasket around the outer periphery has been known as an example of a conventional MEA (for example, see JP-A-2008-177001).

A process for producing the MEA 301 disclosed in JP-A-2008-177001 is shown in FIG. 9.

In FIG. 9, the MEA 301 and the reinforcing frame 302 are placed inside a mold 305 so as not to come into contact with one another, and a space separating them is filled with a gum elastic 303.

The gum elastic 303 penetrates into a gas-diffusion layer 304 constituting the MEA 301, and thus, the MEA 301 and the reinforcing frame 302 is adhered to one another.

In the above-described MEA 212, the polymer electrolyte membrane 201, the fuel-side catalyst layer 202, and the oxidant-side catalyst layer 203 are exposed directly to the gases, and, consequently, deteriorations of the polymer electrolyte membrane 201 are accelerated. That is, there have been problems of durability, and various solutions thereto have been proposed in the past.

For example, in JP-A-2016-103390, a structure of a MEA 212 (FIG. 10) in which spaces 213 and 214 formed among a fuel-side gas-diffusion layer 204/oxidant-side gas-diffusion layer 205, a fuel-side catalyst layer 202/oxidant-side catalyst layer 203, and a frame 211 is filled with a sealing material 225 such as an adhesive has been proposed (FIG. 10).

Accordingly, when the fuel-side catalyst layer 202, and the oxidant-side catalyst layer 203 are hardly exposed to the gases, the durability of the polymer electrolyte membrane 201 is improved.

SUMMARY

However, according to the above conventional art, it is required to provide a step in which the sealing material 225 is provided at the side of the gas-diffusion layer in advance, or a step in which the sealing material 225 is provided at the side of the frame. In that case, it is difficult to align these members and such a structure is complex.

The disclosure has been conceived in view of the above circumstances. An object of the disclosure is to provide polymer electrolyte fuel cells that makes it possible to improve the durability of MEAs by way of avoiding formation of any spaces in which electrolyte membranes and catalyst layers are exposed to reaction gases, based on a simplified production process and, to provide production methods thereof.

In order to achieve the above-mentioned object of the disclosure, provided is a fuel cell, including: (i) an electrolyte membrane; (ii) a fuel-side catalyst layer placed on one surface of the electrolyte membrane; (iii) an oxidant-side catalyst layer placed on another surface of the electrolyte membrane; (iv) a fuel-side gas-diffusion layer placed on a main surface of the fuel-side catalyst layer; (v) an oxidant-side gas-diffusion layer placed on a main surface of the oxidant-side catalyst layer; (vi) a pair of separators that hold the fuel-side gas-diffusion layer and the oxidant-side gas-diffusion layer therebetween; (vii) a frame that surrounds outer peripheries of the fuel-side gas-diffusion layer and the oxidant-side gas diffusion layer; (viii) a fuel-side seal member placed on a main surface of the fuel-side gas-diffusion layer; and (ix) an oxidant-side seal member placed on a main surface of the oxidant-side gas-diffusion layer, wherein the fuel-side gas-diffusion layer and the oxidant-side gas-diffusion layer cover an inner edge of the frame, and are adhered tightly onto the fuel-side seal member and the oxidant-side seal member, respectively, such that no spaces are provided between the fuel-side gas-diffusion layer and the fuel-side catalyst layer, and between the oxidant-side gas-diffusion layer and the oxidant-side catalyst layer.

Furthermore, according to another aspect of the disclosure, provided is a method for producing a fuel cell, including: (i) providing a layer structure including an electrolyte membrane, a fuel-side catalyst layer that is located on one main surface of the electrolyte membrane, and an oxidant-side catalyst layer that is located on another main surface of the electrolyte membrane; (ii) providing a frame so as to surround outer peripheries of the fuel-side catalyst layer and the oxidant-side catalyst layer; (iii) providing a fuel-side seal member on one main surface of the frame adjacent to the fuel-side catalyst layer, and providing an oxidant-side seal member on one main surface of the frame adjacent to the oxidant-side catalyst layer; (iv) providing a fuel-side gas-diffusion layer on one main surface of the fuel-side catalyst layer, and providing an oxidant-side gas-diffusion layer on one main surface of the oxidant-side catalyst layer; (v) providing a pair of the separators, such that one of the separators is placed on another main surface of the fuel-side gas-diffusion layer, and the other separator is placed on another main surface of the oxidant-side gas-diffusion layer; (vi) applying a predetermined pressure to the pair of separators, such that the fuel-side gas-diffusion layer and the oxidant-side gas-diffusion layer are deformed so as to cover an inner edge of the frame, thereby causing the fuel-side gas-diffusion layer and the oxidant-side gas-diffusion layer to adhere tightly to the frame; (vii) further causing the fuel-side gas-diffusion layer and the oxidant-side gas-diffusion layer to the fuel-side seal member and the oxidant-side seal member, such that no spaces are provided between the fuel-side gas-diffusion layer and the fuel-side catalyst layer, and between the oxidant-side gas-diffusion layer and the oxidant-side catalyst layer.

According to the above-mentioned aspects of the disclosure, the stack is pressed by the pair of separators, and thus, the gas-diffusion layers are deformed. As a result, the gas-diffusion layers are brought into close contact with the frame, and thus, cover the main surfaces of the frame at the side where the separators are present. Thus, the formation of spaces are prevented between the frames and the catalyst layers. Accordingly, the disclosure makes it possible to provide fuel cells that have structures suppressing deteriorations of polymer electrolyte membranes.

Furthermore, the disclosure can make it possible to provide such fuel cells based on production processes having a smaller number of steps.

BRIEF DESCRIPTION OF THE DRAWINGS

FIG. 4A is a partial cross-section of a stack along the line A-A in FIG. 3 in a state where the stack has not yet been placed between a pair of separators.

DESCRIPTION OF EMBODIMENTS

Hereinafter, embodiments of the disclosure will be described with reference to the drawings.

First Embodiment

<Structure>

Figure 1:
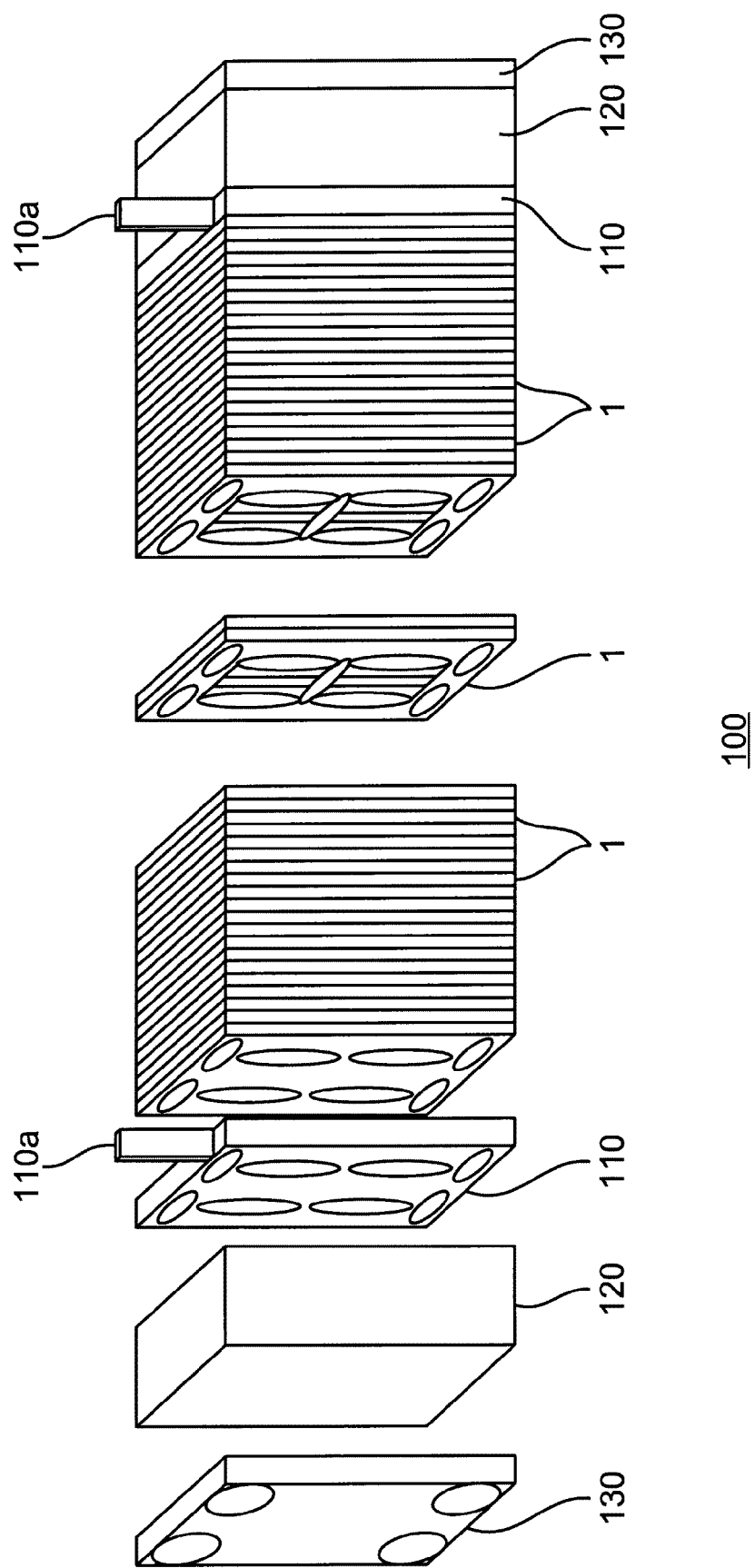
FIG. 1 is an exploded perspective view of a fuel cell stack in the first embodiment of the disclosure.

FIG. 1 is an exploded perspective view of a fuel cell stack 100 in which multiple fuel cells 1 are stacked and that is one example of fuel cells according to the first embodiment.

Gas cutters (not shown in the figure) are provided between adjacent fuel cells 1.

A power collecting plate 110, an insulating plate 120, and a fastener plate 130 are placed in this order at each of sides of the fuel cells in the stacking direction toward each of the edges.

Then, by applying certain loads to fastener plates 130 from both of the edges in the stacking direction, stacked fuel cells 1 are fastened so as to form the fuel cell stack 100.

A terminal 101a for extracting electric currents is provided in each of the power collecting plates 110.

During power generation in the fuel cells 1, electric currents are retrieved through the terminals 110a.

The insulating plates 120 insulate the respective power collecting plates 110 and fastener plates 130 from one another.

Inlets and outlets (not shown in the figures) for gases and refrigerants may be provided in insulating plates 120.

Certain loads are applied from the outside onto the fastener plates 130.

Accordingly, the pair of fastener plates 130 fastens the stacked fuel cells 1, the pair of power collecting plates 110, and the pair of insulating plates 120.

Hereinafter, structures of the fuel cells 1 will be described in detail.

Figure 2:
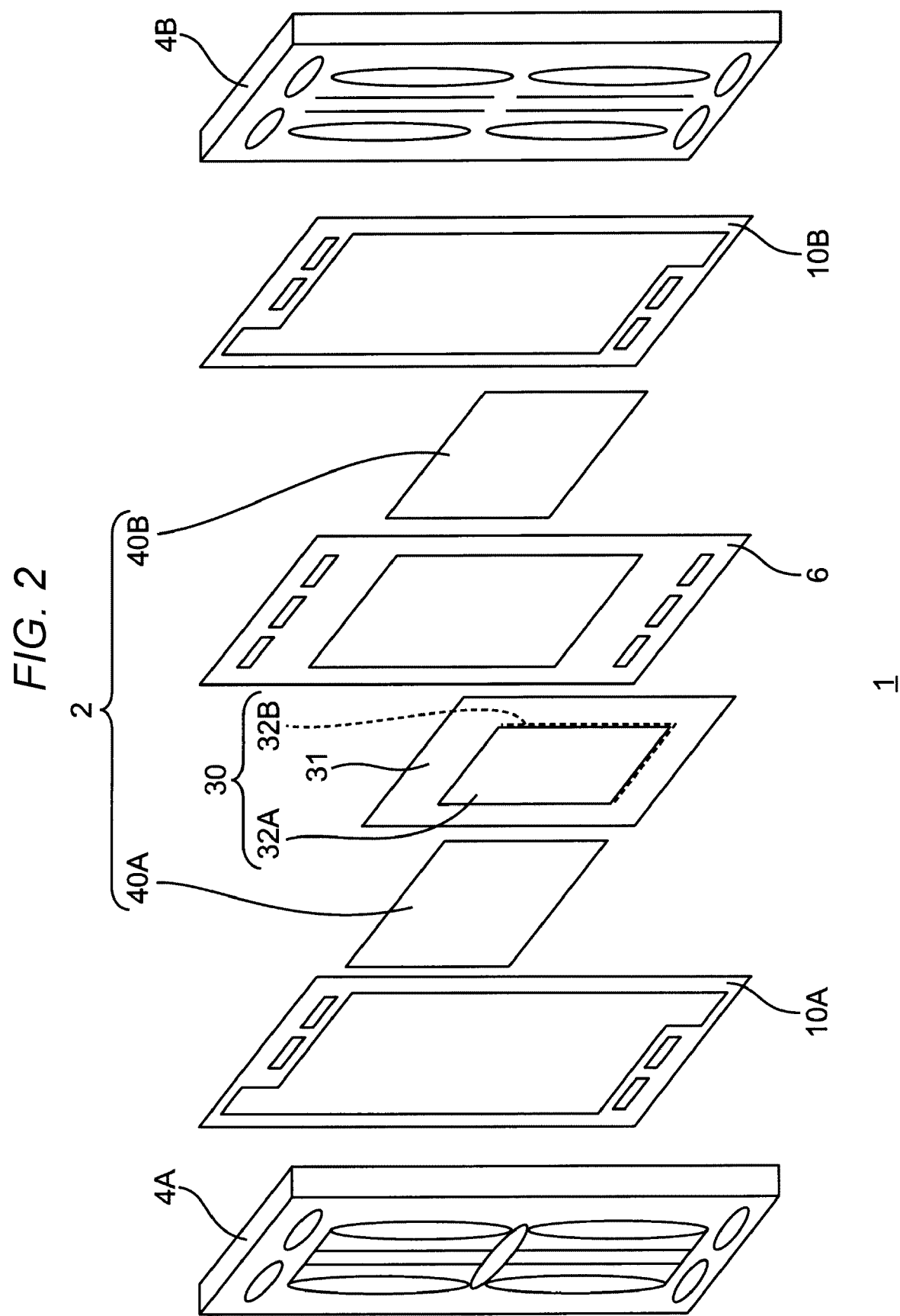
FIG. 2 is an exploded perspective view of a fuel cell stack in the first embodiment of the disclosure.

FIG. 2 is an exploded perspective view of each of the fuel cells 1 in the first embodiment of the disclosure.

In FIG. 2, the fuel cell 1 has a structure in which a stack 2, a fuel-side seal member 10A, an oxidant-side seal member 10B, and a frame 6 are placed between a pair of separators 4A and 4B.

The stack 2 includes a CCM (Catalyst Coated membrane) 30, a fuel-side gas-diffusion layer 40A, and an oxidant-side gas-diffusion layer 40B.

The CCM 30 is formed in an approximately tabular shape.

The fuel-side gas-diffusion layer 40A, and the oxidant-side gas-diffusion layer 40B are provided so as to hold CCM 30 therebetween, such that the main surfaces of these members face one another.

Figure 3:
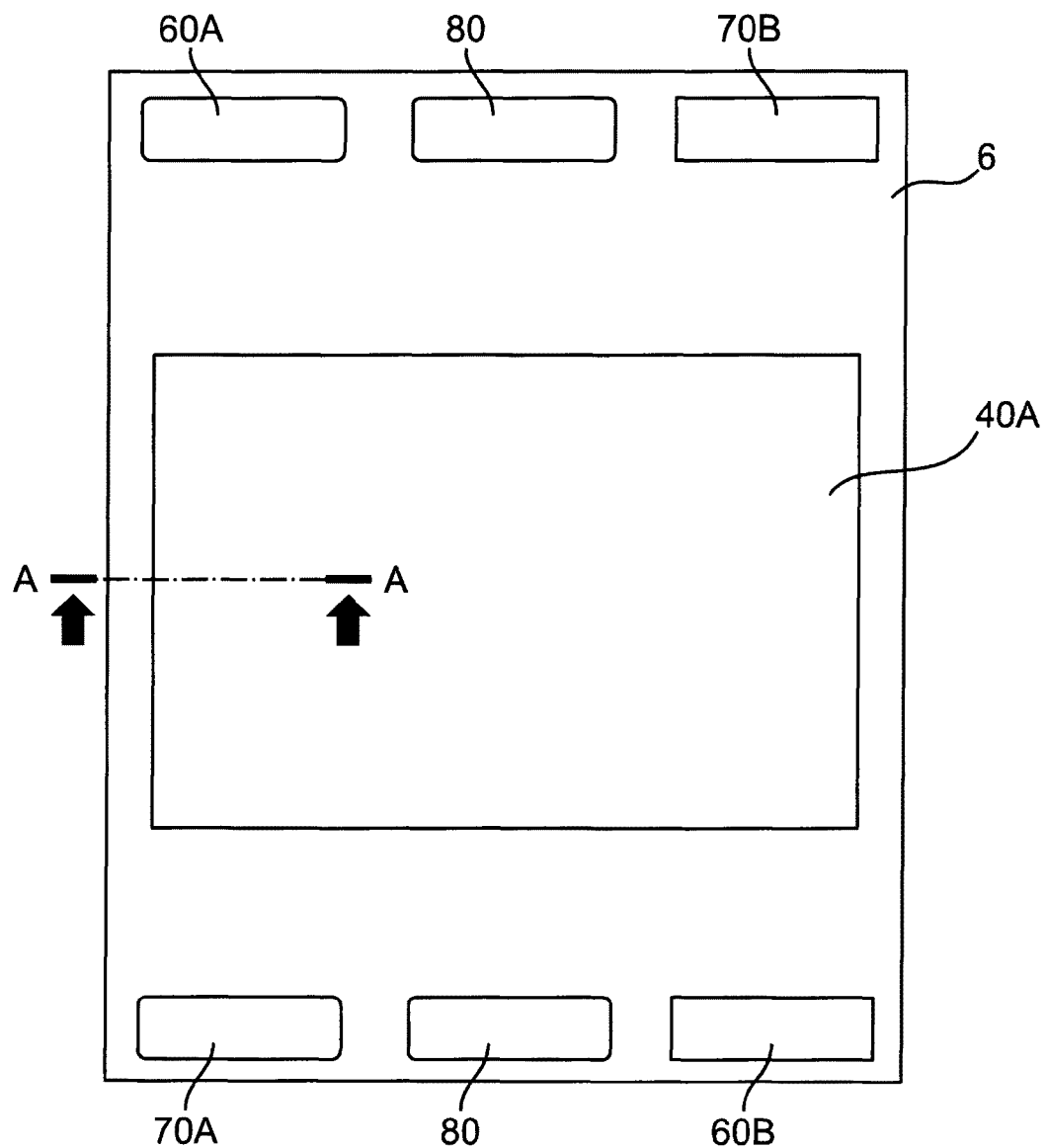
FIG. 3 is a schematic representation of a frame present at the side where a fuel-side gas-diffusion layer is present, and the fuel-side gas diffusion layer, in the fuel cell in the first embodiment of the disclosure.

FIG. 3 refers to a state in which the stack 2 is placed between the pair of separators 4A and 4B. However, in FIG. 3, for the sake of convenience in clearly describing an internal layout structure of the fuel cell 1, depictions of the separator 4A and the fuel-side seal member 10A are omitted.

Additionally, FIG. 3 refers to one example of a side of the fuel cell 1 where the fuel-side gas-diffusion layer 40A is present.

Figure 4B:
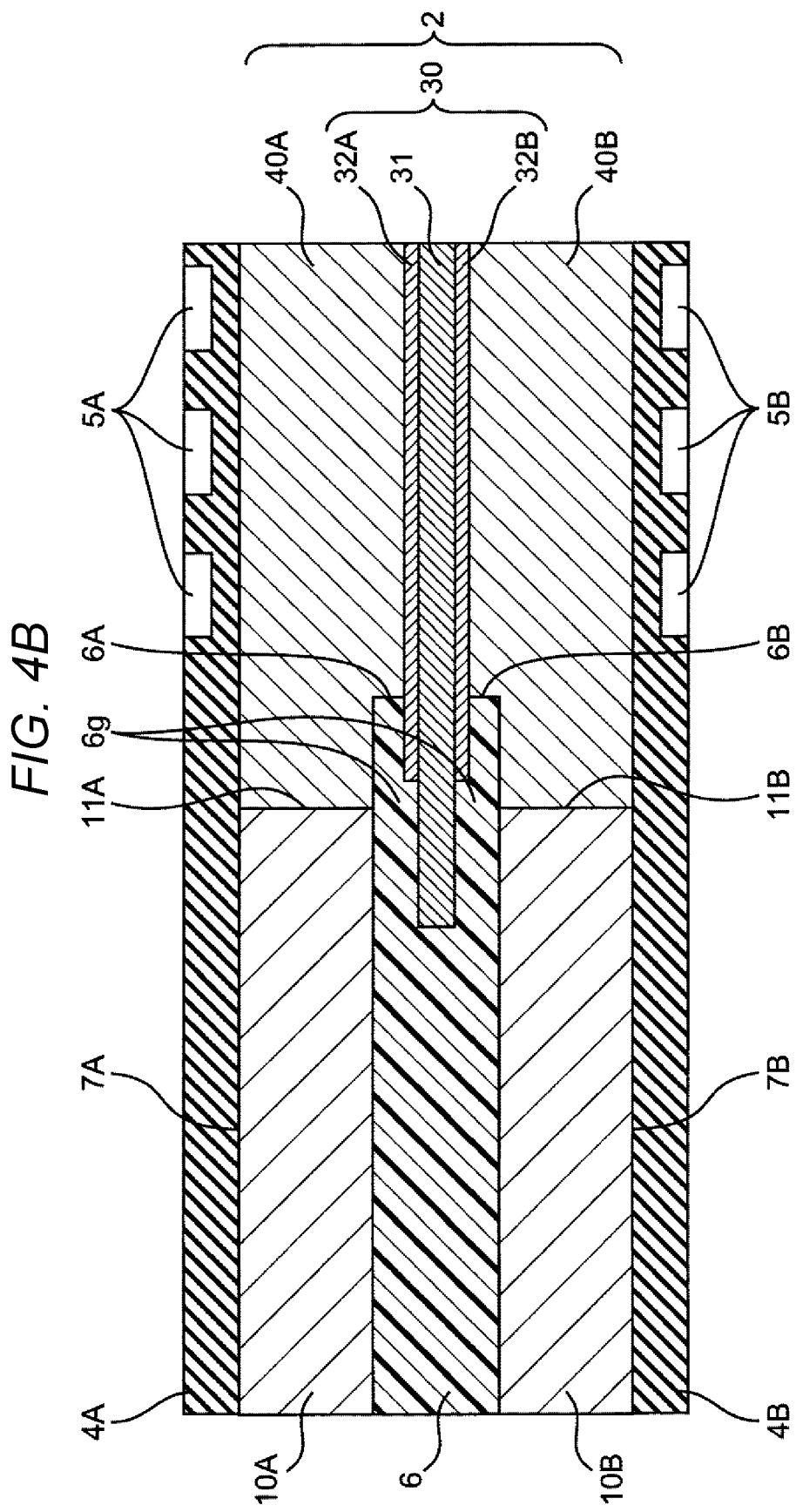
FIG. 4B is a partial cross-section of a stack along the line A-A in FIG. 3 in a state where the stack is placed between a pair of separators.

FIGS. 4A and 4B are cross-sections of parts along the line A-A in FIG. 3.

FIG. 4A shows a state in which the stack 2 has not yet been fixed between the pair of separators 4A and 4B, while FIG. 4B shows a state in which the stack 2 is fixed between the pair of separators 4A and 4B.

The separator 4A is stacked on a main surface of the fuel-side gas-diffusion layer 40A on the side opposite to the CCM 30, while the separator 4B is stacked on a main surface of the oxidant-side gas-diffusion layer 40B on the side opposite to the CCM 30.

The CCM 30 includes an electrolyte membrane 31, a fuel-side catalyst layer 32A placed on one main surface of the electrolyte membrane 31, and an oxidant-side catalyst layer 32B placed on another main surface of the electrolyte membrane 31.

<Electrolyte Membrane 31>

A polymer electrolyte sheet having hydrogen-ion conduction would sufficiently serve as the electrolyte membrane 31. However, a polymer electrolyte having excellent heat resistance and chemical stability is preferable.

As an example of a polymer electrolyte, perfluoro carbon sulfonic acid type polymers can be used.

One example of a perfluoro carbon sulfonic acid type polymer is Nafion (registered trademark).

The fuel-side catalyst layer 32A and the oxidant-side catalyst layer 32B each have ion-exchange resins and catalyst particles. The fuel-side catalyst layer 32A and the oxidant-side catalyst layer 32B may also have carbon particles carrying catalyst particles in some cases.

The ion-exchange resins possessed by the fuel-side catalyst layer 32A and the oxidant-side catalyst layer 32B connect the catalyst particles and the electrolyte membrane 31 to one another, and thus, have roles in conveying protons between the catalyst particles and the electrolyte membrane 31.

The ion-exchange resins can be formed from the same polymer materials as those employed in the electrolyte membrane 31.

For catalyst metals used for the catalyst particles in the fuel-side catalyst layer 32A, Pt—Ru alloys, and the like can be employed.

For catalyst metals used for the catalyst particles in the oxidant-side catalyst layer 32B, Pt, Pt—Co alloys, and the like can be employed.

For the carbon particles, acetylene black, Ketjenblack, carbon nanotubes, and the like can be employed.

<Gas-Diffusion Layer>

The fuel-side gas-diffusion layer 40A is placed on one main surface of the fuel-side catalyst layer 32A in the CCM 30.

The fuel-side gas-diffusion layer 40A is formed of a composite material of thermoplastic resins and conductive particles.

The thermoplastic resins serve as binders for binding the conductive particles to one another.

Thus, the fuel-side gas-diffusion layer 40A has a structure in which the conductive particles are incorporated into a network structure formed by the thermoplastic resins.

For this reason, the fuel-side gas-diffusion layer 40A is provided as a conductive layer having numerous fine pores.

For the conductive particle, carbon particles (e.g. particles made of e.g. carbon black, artificial graphite, natural graphite, or expanded graphite), metal particles, and the like may be employed.

The oxidant-side gas-diffusion layer 40B is placed on one main surface oxidant-side catalyst layer 32B in the CCM 30.

The oxidant-side gas-diffusion layer 40B is formed of a composite material of thermoplastic resins and conductive particles.

Thus, the oxidant-side gas-diffusion layer 40B is provided as a conductive layer having numerous fine pores, in the same manner as the fuel-side gas-diffusion layer 40A.

<Frame 6>

The frame 6 is a member that is placed between the pair of separators 4A and 4B and that surrounds outer peripheries of the fuel-side gas-diffusion layer 40A and the oxidant-side gas-diffusion layer 40B.

Thus, the stack 2 is installed within a space separated by the separators 4A and 4B, and the frame 6.

The frame 6 has a fuel-supplying manifold 60A, an oxidant-discharging manifold 70A, and a refrigerant manifold 80A at one edge side, and has a fuel-discharging manifold 60B, an oxidant-supplying manifold 70A, and a refrigerant manifold 80A at another edge side opposite to the above one edge side.

The frame 6 may be formed of thermosetting resins.

As examples of the thermosetting resins, epoxy resins, PPS (polyphenylene sulfide) resins, and the like can be used.

The fuel-side seal member 10A and the oxidant-side seal member 10B are placed on the respective main surfaces of the separators that the frame 6 faces.

The fuel-side seal member 10A and the oxidant-side seal member 10B may be formed of thermosetting resins. These seal members may be formed of resins at least partially containing insulative fiber sheets.

As examples of the thermosetting resins, epoxy resins and the like can be used.

<Separators 4A and 4B>

The separators 4A and 4B fasten one stack 2, i.e. a fuel-side gas-diffusion layer 40A and an oxidant-side gas-diffusion layer 40B included therein, by way of mechanically holding these layers therebetween. The separators 4A and 4B also electrically connect adjacent stacks 2 in series.

The separators 4A and 4B also have roles as pathways for purposes of supplying gases to the fuel-side gas-diffusion layer 40A and the oxidant-side gas-diffusion layer 40B, respectively, and carrying produced water and surplus gases therefrom.

Gas flow channels may be formed on inner surfaces of the separators 4A and 4B (i.e., surfaces thereof facing the fuel-side gas-diffusion layer 40A and the oxidant-side gas-diffusion layer 40B, respectively).

One surface of the separator 4A is brought into contact with a main surface 42A of the fuel-side gas-diffusion layer 40A.

Another main surface of the separator 4A (i.e., the main surface on the side opposite to the stack 2) is provided with refrigerant flow channels 5A for cooling the stack 2.

One surface of the separator 4B is brought into contact with a main surface 42B of the oxidant-side gas-diffusion layer 40B.

Another main surface of the separator 4B (i.e., the main surface on the side opposite to the stack 2) is provided with refrigerant flow channels 5B for cooling the stack 2.

The refrigerant flow channels 5A and 5B are communicated with the refrigerant manifold 80A.

Materials of the separators 4A and 4B are not particularly limited as long as they have sufficient airtightness, electron conductance, and electrochemical stability.

<Reaction>

In the polymer electrolyte fuel cells 1, the following reactions will occur.

That is, when hydrogen gases serving as fuel gases are supplied to the fuel-side catalyst layer 32A through the fuel-side gas-diffusion layer 40A, a reaction shown by formula (1) below is caused in the fuel-side catalyst layer 32A, and thus, the hydrogen is decomposed into protons and electrons.

The produced protons move through the electrolyte membrane 31 toward the oxidant-side catalyst layer 32B.

The electrons pass through the fuel-side gas-diffusion layer 40A and the separator 4A, and reach an external circuit (not shown in the figures). Then, the electrons move out of the external circuit, pass through the separator 4B and the oxidant-side gas-diffusion layer 40B, and further flow into the oxidant-side catalyst layer 32B.

Meanwhile, when the air serving as an oxidant gas is supplied to the oxidant-side catalyst layer 32B through the oxidant-side gas-diffusion layer 40B, a reaction shown by formula (2) below will occur in the oxidant-side catalyst layer 32B. Thus, oxygen present in the air reacts with the protons and the electrons so as to become water.

As a result, electrons flow through the external circuit to a direction from the anode toward the cathode, and produce electric power that can be retrieved.

$$\text{Fuel-side catalyst layer 32A: } H_2 \rightarrow 2H^+ + 2e^- \quad (1)$$

$$\text{Oxidant-side catalyst layer 32B: } 2H^+ + (\tfrac{1}{2})O_2 + 2e^- \rightarrow H_2O \quad (2)$$

<Assembly>

As shown in FIG. 4A, the separator 4A and 4B are placed such that the stack 2 is provided between the separators 4A and 4B.

When certain loads are applied to a pair of fastener plates 130 (see FIG. 1), the separators 4A and 4B are shifted toward a direction in which they come closer to one another.

Then, as shown FIG. 4B, the separator 4A presses against the stack 2 at a certain pressure. Accordingly, the separator 4A is brought into contact with a surface 7A of the fuel-side seal member 10A facing the separator 4A, and thus, stops moving.

The separator 4B presses against the stack 2 at a certain pressure. Accordingly, the separator 4B is brought into contact with a surface 7B of the oxidant-side seal member 10B facing the separator 4B, and thus, stops moving.

In a state in which the stack 2 is not held between the pair of separators 4A and 4B at a certain pressure, the fuel-side gas-diffusion layer 40A has a projection 20A that projects toward the separator 4A ahead of the surface 7A of the fuel-side seal member 10A facing the separator 4A.

Furthermore, in a state in which the stack 2 is not held between the pair of separators 4A and 4B at a certain pressure, the oxidant-side gas-diffusion layer 40B has a projection 20B that projects toward the separator 4B ahead of a surface 7B of the oxidant-side seal member 10B facing the separator 4B.

Accordingly, when the stack 2 is held between the pair of separators 4A and 4B at a certain pressure, the projection 20A is depressed by the separator 4A, and also, the projection 20B is depressed by the separator 4B.

In addition, if proportions of the projections 20A and 20B are excessively small, the fuel-side gas-diffusion layer 40A and the oxidant-side gas-diffusion layer 40B may not be able to entirely cover the fuel-side catalyst layer 32A even when the fuel-side gas-diffusion layer 40A and the oxidant-side gas-diffusion layer 40B are deformed. Therefore, the proportions of the projections 20A and 20B are preferably at least 10% or more of volumes of the fuel-side gas-diffusion layer 40A and the oxidant-side gas-diffusion layer 40B, respectively.

As described above, the fuel-side gas-diffusion layer 40A and the oxidant-side gas-diffusion layer 40B each have a structure in which conductive particles are incorporated into a network structure of thermoplastic resins.

Meanwhile, the fuel-side seal member 10A and the oxidant-side seal member 10B are formed of thermosetting resins.

Therefore, the fuel-side gas-diffusion layer 40A and the oxidant-side gas-diffusion layer 40B have lower rigidity compared with the fuel-side seal member 10A and the oxidant-side seal member 10B.

Figure 5A:
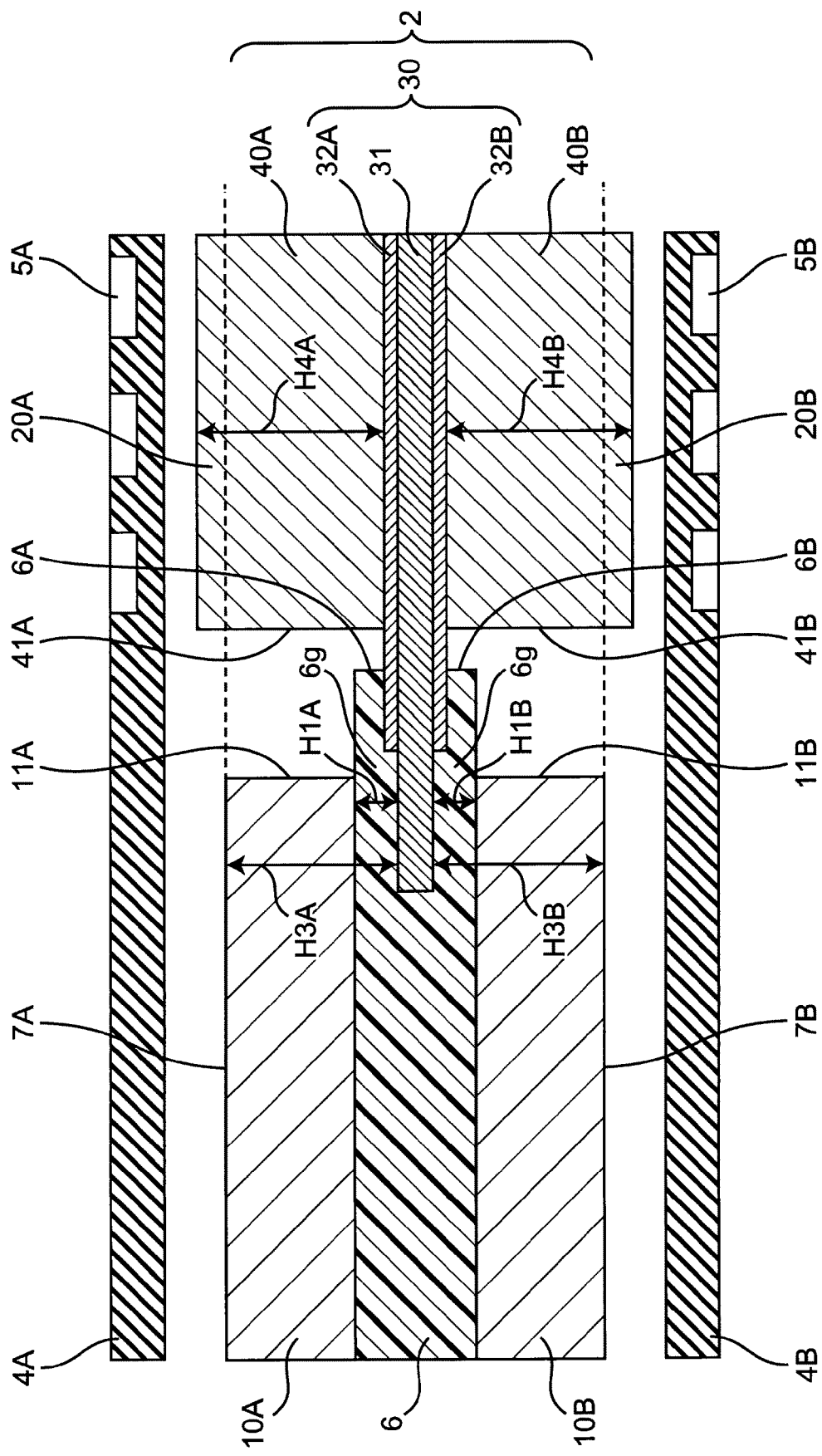
FIG. 5A is a partial cross-section of a stack in a state where the stack has not yet been placed between a pair of separators, in a fuel cell according to a second embodiment of the disclosure (equivalent to the cross-section along the line A-A in FIG. 3)
Figure 5B:
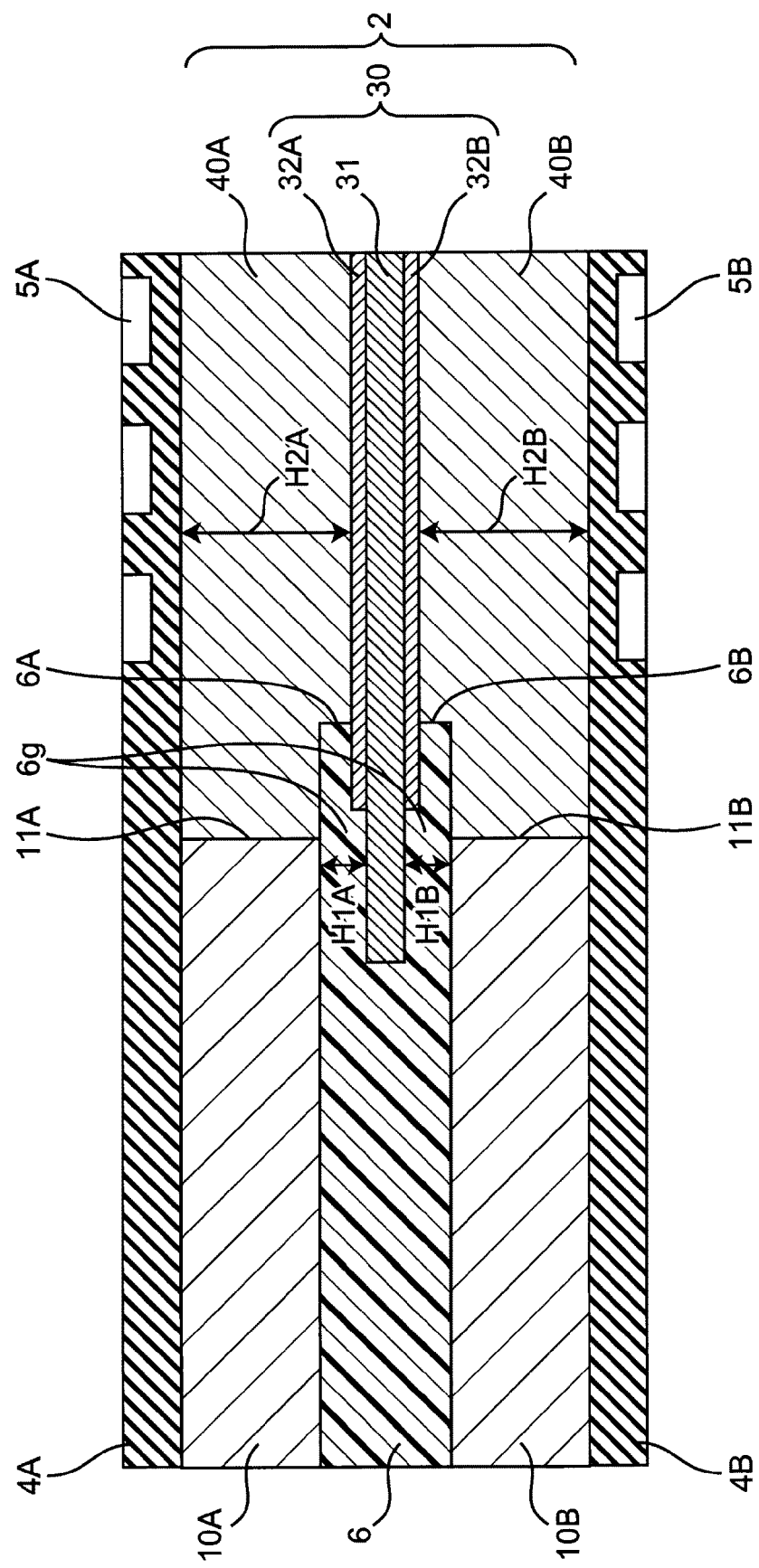
FIG. 5B is a partial cross-section of the stack in a state where the stack is placed between a pair of separators, in a fuel cell according to the second embodiment of the disclosure (equivalent to the cross-section along the line A-A in FIG. 3)

Accordingly, when the projections 20A and 20B are depressed, the fuel-side gas-diffusion layer 40A and the oxidant-side gas-diffusion layer 40B are deformed so as to extend to the outer circumferential direction of the fuel cell 1 (e.g., the left-hand directions in FIGS. 5A and 5B, i.e., directions toward the fuel-side seal member 10A and the oxidant-side seal member 10B).

Consequently, side surfaces 41A and 41B of the fuel-side gas-diffusion layer 40A and the oxidant-side gas-diffusion layer 40B are adhered tightly or rigidly onto inner surfaces 6A and 6B of the frame 6, respectively.

In that case, for example, as shown in FIG. 5A, parts of the fuel-side catalyst layer 32A and the oxidant-side catalyst layer 32B protruding from the area between the fuel-side gas-diffusion layer 40A and the oxidant-side gas-diffusion layer 40B when the stack 2 is held between the pair of separators 4A and 4B at a certain pressure will be covered with the fuel-side gas-diffusion layer 40A and the oxidant-side gas-diffusion layer 40B, such that the fuel-side gas-diffusion layer 40A and the fuel-side catalyst layer 32A, and the oxidant-side gas-diffusion layer 40B and the oxidant-side catalyst layer 32B, respectively, are appressed against each other so as not to form any spaces therebetween.

Additionally, the fuel-side gas-diffusion layer 40A, the oxidant-side gas-diffusion layer 40B, the fuel-side seal member 10A, and the oxidant-side seal member 10B are in a solid state.

Accordingly, as described above, pressure is applied on the fuel-side gas-diffusion layer 40A and the oxidant-side gas-diffusion layer 40B so as to bring the fuel-side seal member 10A and the oxidant-side seal member 10B into close contact with each other, thereby eliminating the above-mentioned spaces.

By a final heat treatment, the fuel-side seal member 10A and the oxidant-side seal member 10B become hardened.

Then, the fuel-side gas-diffusion layer 40A and the oxidant-side gas-diffusion layer 40B will deform so as to cover parts of the main surfaces of the frame 6 (i.e., parts that protrude from the area between the fuel-side seal member 10A and the oxidant-side seal member 10B when the stack is not held between the pair of separators 4A and 4B, for example, as shown in FIG. 5A), and thus, the fuel-side gas-diffusion layer 40A and the oxidant-side gas-diffusion layer 40B are adhered tightly or rigidly onto the inner surfaces 11A and 11B of the fuel-side seal member 10A and the fuel-side seal member 10B, respectively.

When the fuel-side gas-diffusion layer 40A deforms, certain areas in the vicinity of parts of the fuel-side gas-diffusion layer 40A that connect to the separator 4A and the frame 6 will deform so as to follow the shapes of the connection parts.

Furthermore, when the oxidant-side gas-diffusion layer 40B deforms, certain areas in the vicinity of parts of the oxidant-side gas-diffusion layer 40B that connect to the separator 4B and the frame 6 will deform so as to follow the shapes of the connection parts.

Additionally, even if certain parts of the fuel-side catalyst layer 32A and the oxidant-side catalyst layer 32B are exposed in a state where the fuel-side gas-diffusion layer 40A and the oxidant-side gas-diffusion layer 40B have not yet been deformed, the exposed area will be covered with the gas-diffusion layers through deformation of the fuel-side gas-diffusion layer 40A and the oxidant-side gas-diffusion layer 40B.

Accordingly, the fuel-side catalyst layer 32A and the oxidant-side catalyst layer 32B will not be exposed to the reaction gases, and thus, durability of the electrolyte membrane 31 will be improved.

Furthermore, areas of the fuel-side catalyst layer 32A and the oxidant-side catalyst layer 32B that contribute to power generation in the fuel cell 1 can be increased, and thus, it becomes possible to increase the power generation active area in fuel cell 1.

Additionally, it also becomes possible to suppress cross leakage in the exposed areas of the fuel-side catalyst layer 32A and the oxidant-side catalyst layer 32B.

According to the first embodiment, the stack 2 is depressed by the pair of separators 4A and 4B, and, consequently, the fuel-side gas-diffusion layer 40A and the oxidant-side gas-diffusion layer 40B are deformed so as to come into close contact with the frame 6, thereby covering the main surfaces of the frame 6 at respective sides of the separators. Accordingly, spaces formed by the frame 6, and the fuel-side catalyst layer 32A and the oxidant-side catalyst layer 32B can be prevented to suppress deterioration of the electrolyte membrane 31.

Second Embodiment

The second embodiment will be described based on FIGS. 5A and 5B.

FIGS. 5A and 5B are partial cross-sections of areas of fuel cells 1 equivalent to the line A-A in FIG. 3.

In FIGS. 5A and 5B, the same elements found in FIGS. 4A and 4B will be referred to by the same reference symbols, and descriptions thereon will be omitted.

Now, let H1A be a mean thickness of an inner edge part 6g of the frame 6 from the electrolyte membrane 31 to the surface of the inner edge part 6g facing the separator 4A; and let H2A be a mean thickness of the fuel-side gas-diffusion layer 40A from the fuel-side catalyst layer 32A to the surface of the fuel-side gas-diffusion layer 40A facing the separator 4A. Then, H1A<H2A in a state where the stack 2 is held between separators 4A and 4B at a certain pressure as shown in FIG. 5B.

That is, a mean thickness H4A of the fuel-side gas-diffusion layer 40A from the fuel-side catalyst layer 32A to the surface of the fuel-side gas diffusion layer 40A facing the separator 4A is larger than a mean thickness H3A of the frame 6 from the electrolyte membrane 31 to the surface of the frame 6 facing the separator 4A, in a state in which the stack 2 is not held between the separators 4A and 4B at a certain pressure as shown in FIG. 5A.

The same relationship among the thicknesses are found in the side where the oxidant-side gas-diffusion layer 40B is present.

That is, let H1B be a mean thickness of an inner edge part 6g of the frame 6 from the electrolyte membrane 31 to the surface of the inner edge part 6g facing the separator 4B; and let H2A be a mean thickness of the oxidant-side gas-diffusion layer 40B from the fuel-side catalyst layer 32A to the surface of the oxidant-side gas-diffusion layer 40B facing the separator 4B. Then, H1B<H2A in a state where the stack 2 is held between separators 4A and 4B at a certain pressure as shown in FIG. 5B.

That is, a mean thickness H4B of the oxidant-side gas-diffusion layer 40B from the oxidant-side catalyst layer 32B to the surface of the oxidant-side gas diffusion layer 40B facing the separator 4B is larger than a mean thickness H3B of the frame 6 from the electrolyte membrane 31 to the surface of the frame 6 facing the separator 4B, in a state in which the stack 2 is not held between the separators 4A and 4B at a certain pressure as shown in FIG. 5A.

According to the above configuration, besides the advantages obtained in the first embodiment, lateral surfaces 41A and 41B of the fuel-side gas-diffusion layer 40A and the oxidant-side gas-diffusion layer 40B are reliably brought into close contact with inner surfaces 6A and 6B of the frame 6, and thus, the main surfaces of the fuel-side catalyst layer 32A and the oxidant-side catalyst layer 32B are reliably covered with the fuel-side gas-diffusion layer 40A and the oxidant-side gas-diffusion layer 40B, respectively. Accordingly, deterioration of the electrolyte membrane 31 due to exposure to the reaction gases can reliably be suppressed.

Third Embodiment

The third embodiment will be described with reference to FIGS. 6A to 6D.

FIGS. 6A to 6D are cross-sections that schematically describes steps in a method for producing a fuel cell 1 according to the disclosure.

Figure 6A:
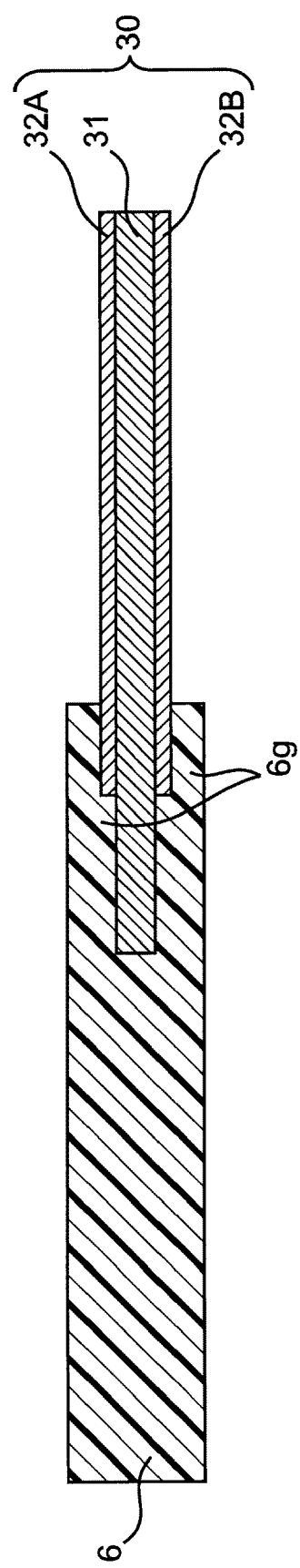
FIG. 6A is a cross-section that schematically shows a method for producing a fuel cell according to a third embodiment of the disclosure (equivalent to the cross-section along the line A-A in FIG. 3)

As shown in FIG. 6A, an electrolyte membrane 31, a fuel-side catalyst layer 32A that is placed on one main surface of the electrolyte membrane 31, and an oxidant-side catalyst layer 32B that is placed on another main surface of the electrolyte membrane 31 are provided.

Then, a frame 6 is provided so as to surround the outer peripheries of a fuel-side gas-diffusion layer 40A and an oxidant-side gas-diffusion layer 40B.

Figure 6B:
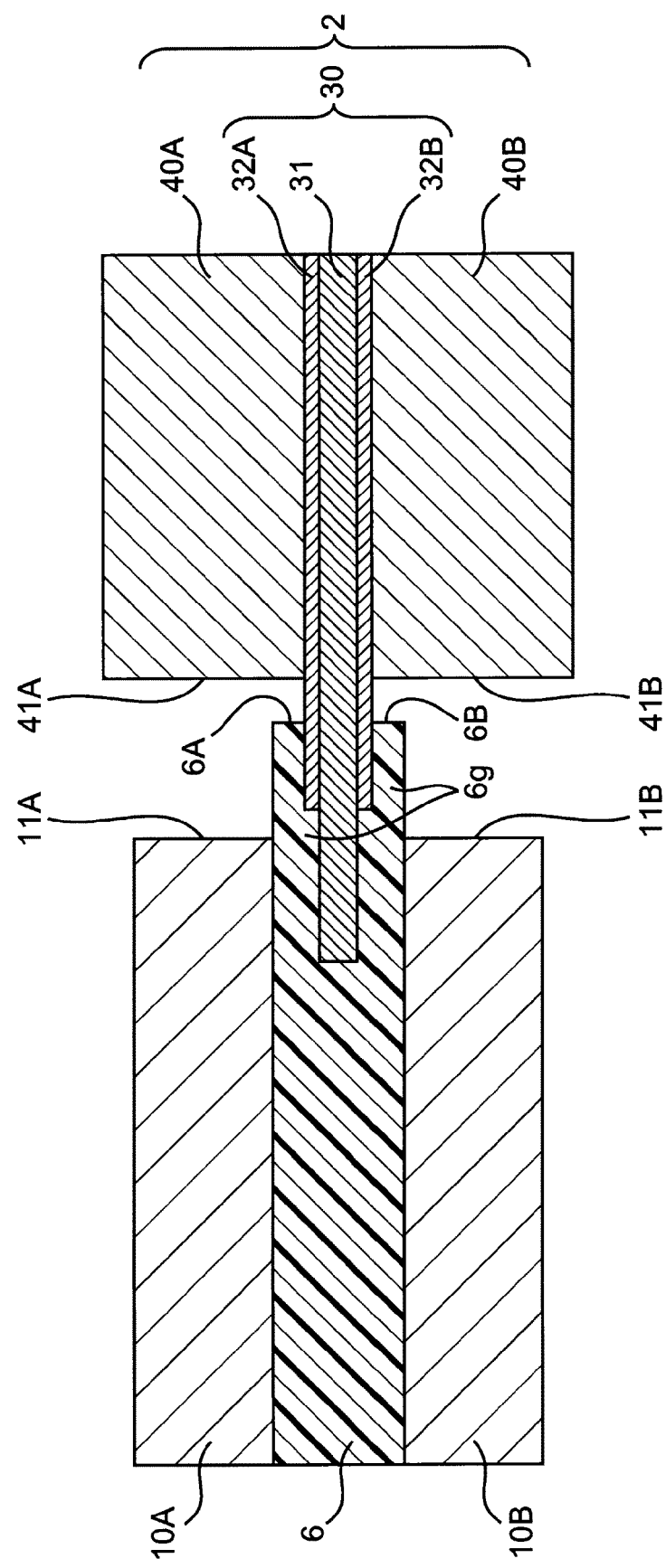
FIG. 6B is a cross-section that schematically shows a method for producing a fuel cell according to the third embodiment of the disclosure (equivalent to the cross-section along the line A-A in FIG. 3)

Then, as shown in FIG. 6B, a fuel-side seal member 10A is placed on a main surface of the frame 6 adjacent to the fuel-side catalyst layer 32A, and an oxidant-side seal member 10B is placed on another main surface of the frame 6 adjacent to the oxidant-side catalyst layer 32B.

Furthermore, a fuel-side gas-diffusion layer 40A is placed on a main surface of the fuel-side catalyst layer 32A, and an oxidant-side gas-diffusion layer 40B is placed on a main surface of the oxidant-side catalyst layer 32B.

Thus, a stack 2 is formed.

Accordingly, a lateral surface 41A of the fuel-side gas-diffusion layer 40A and a lateral surface 41B of the oxidant-side gas-diffusion layer 40B are caused to face inner surfaces 6A and 6B of the frame 6.

Figure 6C:
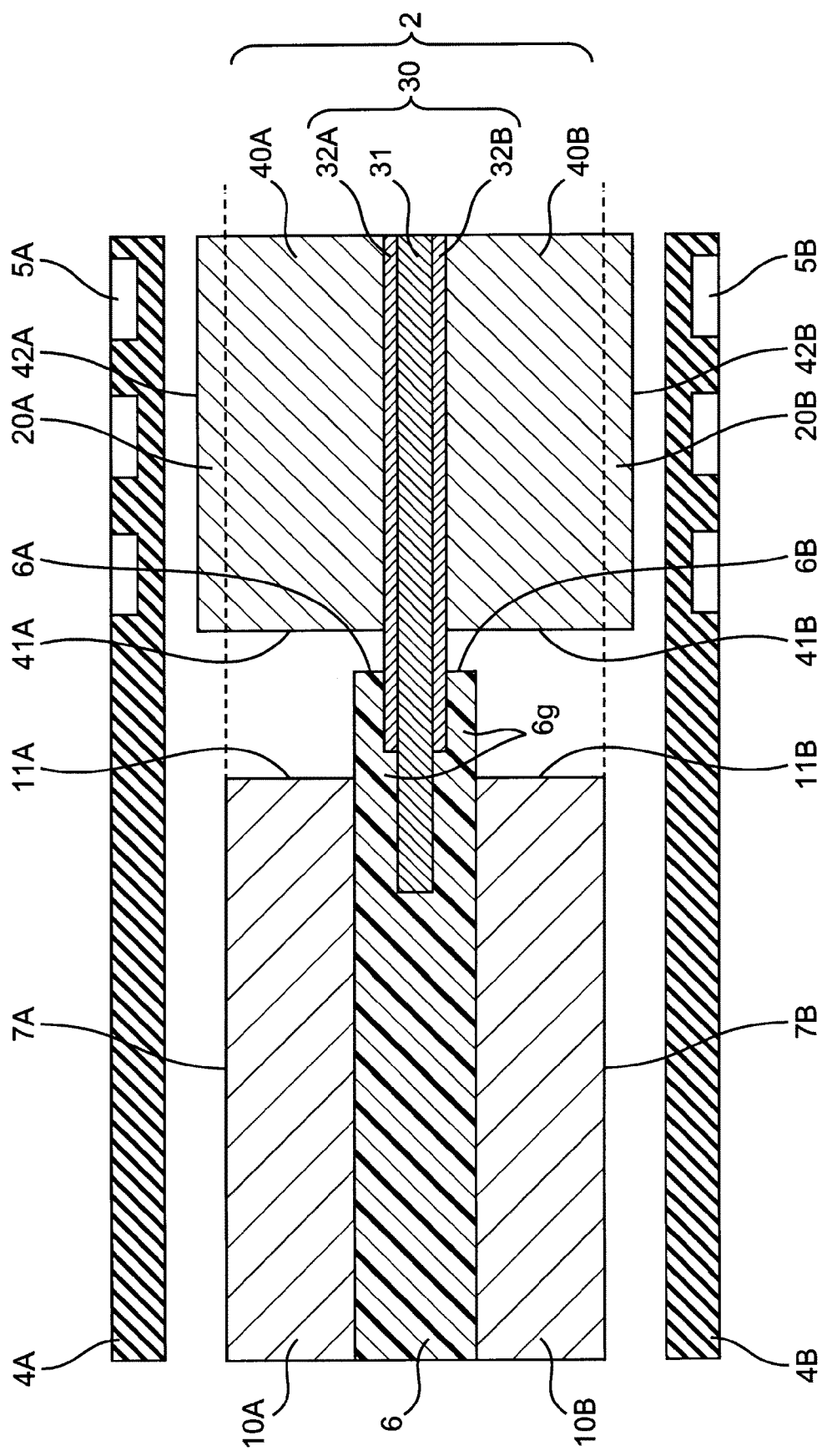
FIG. 6C is a cross-section that schematically shows a method for producing a fuel cell according to the third embodiment of the disclosure (equivalent to the cross-section along the line A-A in FIG. 3)

Then, as shown in FIG. 6C, a separator 4A is placed on a main surface 42A of the fuel-side gas-diffusion layer 40A on the side opposite to the assembly 30, and another separator 4B is placed on a main surface 42B of the oxidant-side gas-diffusion layer 40B on the side opposite to the assembly 30

Figure 6D:
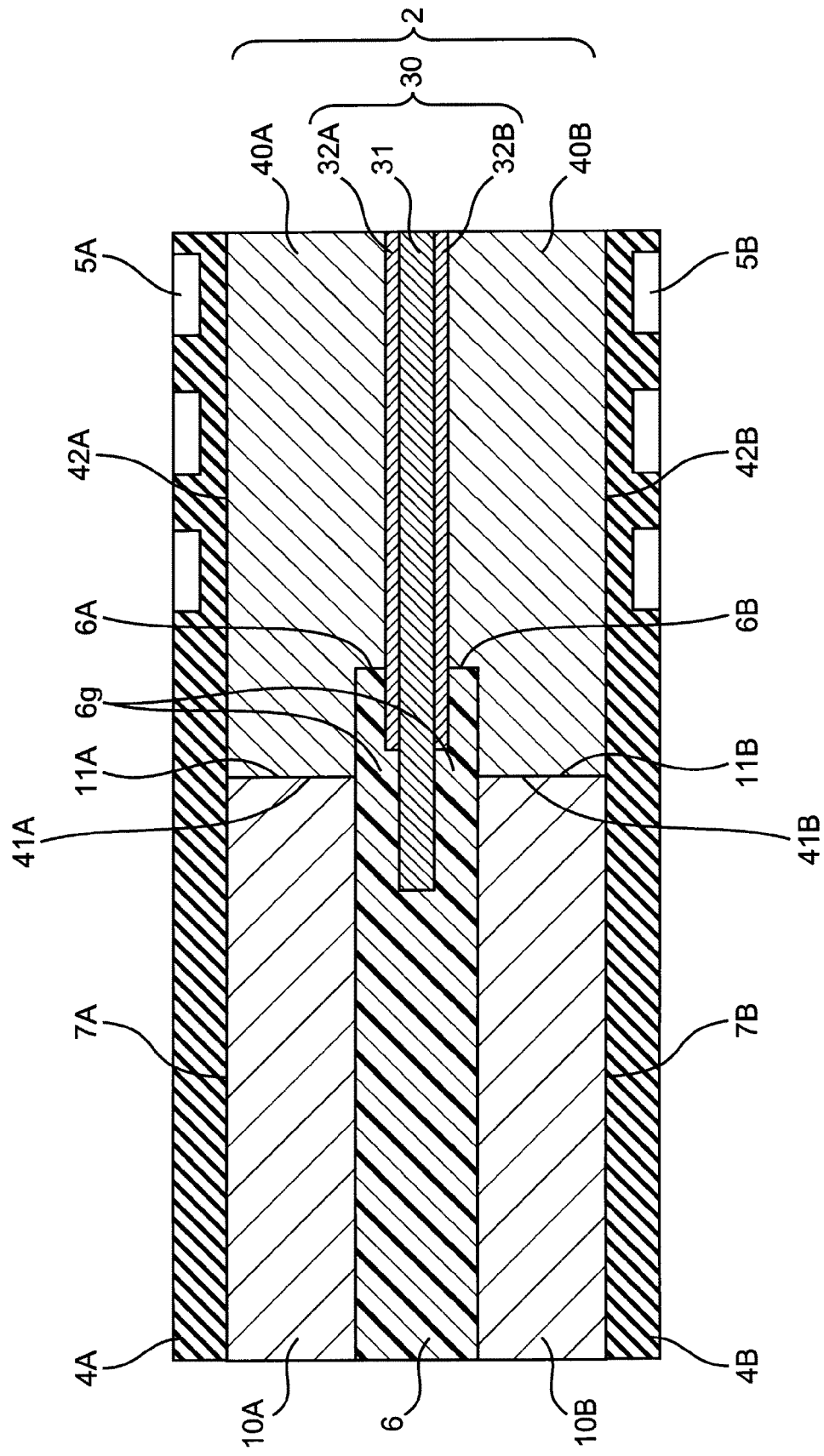
FIG. 6D is a cross-section that schematically shows a method for producing a fuel cell according to the third embodiment of the disclosure (equivalent to the cross-section along the line A-A in FIG. 3)

Then, while a certain pressure is applied to a pair of separators 4A and 4B as shown in FIG. 6D, projections 20A and 20B shown in FIG. 6C are depressed.

Accordingly, the fuel-side gas-diffusion layer 40A and the oxidant-side gas-diffusion layer 40B are caused to deform. Consequently, inner edges 6g of the frame 6 are covered with the fuel-side gas-diffusion layer 40A and the oxidant-side gas-diffusion layer 40B, and thus, the fuel-side gas-diffusion layer 40A and the oxidant-side gas-diffusion layer 40B are appressed against the frame 6.

Then, the fuel-side gas-diffusion layer 40A is appressed against the inner surface 11A of the fuel-side seal member, and the oxidant-side gas-diffusion layer 40B is appressed against inner surface 11B of the oxidant-side seal member such that any spaces are not formed between the fuel-side gas-diffusion layer 40A and the fuel-side catalyst layer 32A, and between the oxidant-side gas-diffusion layer 40B and the oxidant-side catalyst layer 32B, respectively.

That is, parts of the fuel-side catalyst layer 32A and the oxidant-side catalyst layer 32B protruding from the area between the fuel-side gas-diffusion layer 40A and the oxidant-side gas-diffusion layer 40B when the stack 2 is not held between the pair of separators 4A and 4B at a certain pressure can be covered with the fuel-side gas-diffusion layer 40A and the oxidant-side gas-diffusion layer 40B, such that the fuel-side gas-diffusion layer 40A and the fuel-side catalyst layer 32A, and the oxidant-side gas-diffusion layer 40B and the oxidant-side catalyst layer 32B, respectively, are appressed against each other so as not to form any spaces therebetween.

Based on the above steps, a fuel cell 1 can be produced.

According to the second embodiment, the stack 2 is depressed by the pair of separators 4A and 4B, the fuel-side gas-diffusion layer 40A and the oxidant-side gas-diffusion layer 40B are deformed so as to be appressed against the frame 6, and thus, cover the respective main surfaces of the frame 6 on the sides adjacent to the separators. As a result, a fuel cell 1 having a structure that makes it possible to prevent formation of a space between the frame 6 and the fuel-side catalyst layer 32A or the oxidant-side catalyst layer 32B, can be provided based on production processes having a smaller number of steps. In comparison, such a space is possibly formed in the conventional arts.

As described above, according to the third embodiment, specific members for preventing formation of the above-mentioned space are not required, and a fuel cell 1 can be produced based on the above-described simple structure.

Fourth Embodiment

The fourth embodiment will be described with reference to FIGS. 7A to 7E.

FIGS. 7A to 7E are enlarged cross-sections of inner surfaces of seal members in a fuel cell 1 according to the disclosure.

When fuel cells are produced based on the production methods described in the first to third embodiments, the fuel-side gas-diffusion layers 40A are caused to press against the fuel-side seal members 10A.

In that case, the fuel-side gas-diffusion layer 40A is preferably caused to rigidly or strongly press against the fuel-side seal members 10A.

The shape in that case is shown in FIGS. 7A to 7E.

Figure 7A:
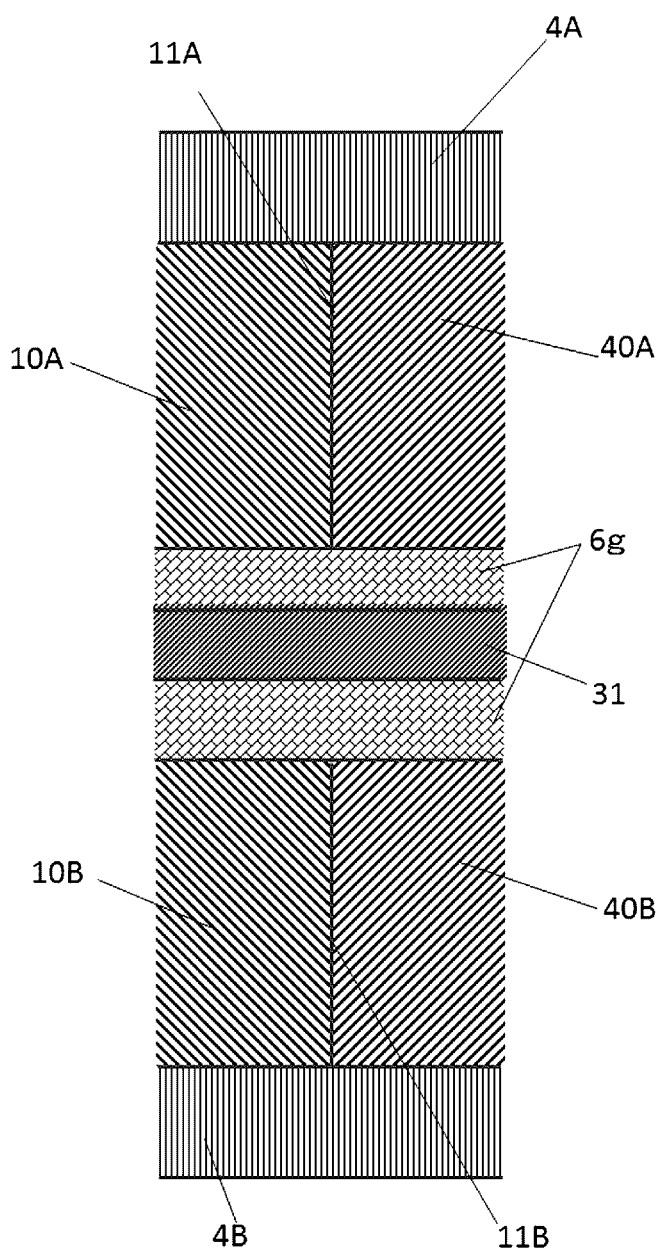
FIG. 7A is an enlarged cross-section of an inner surface of a seal member in a fuel cell according to a fourth embodiment of the disclosure.

FIG. 7A shows a case in which the fuel-side gas-diffusion layer 40A pushes the fuel-side seal member 10A to the minimum level.

The inner surface 11A of the fuel-side seal member is vertical to the electrolyte membrane 31 or the frame 6.

The shape shown in FIG. 7A brings about the same effects as FIGS. 4B, 5B and 6D.

Figure 7B:
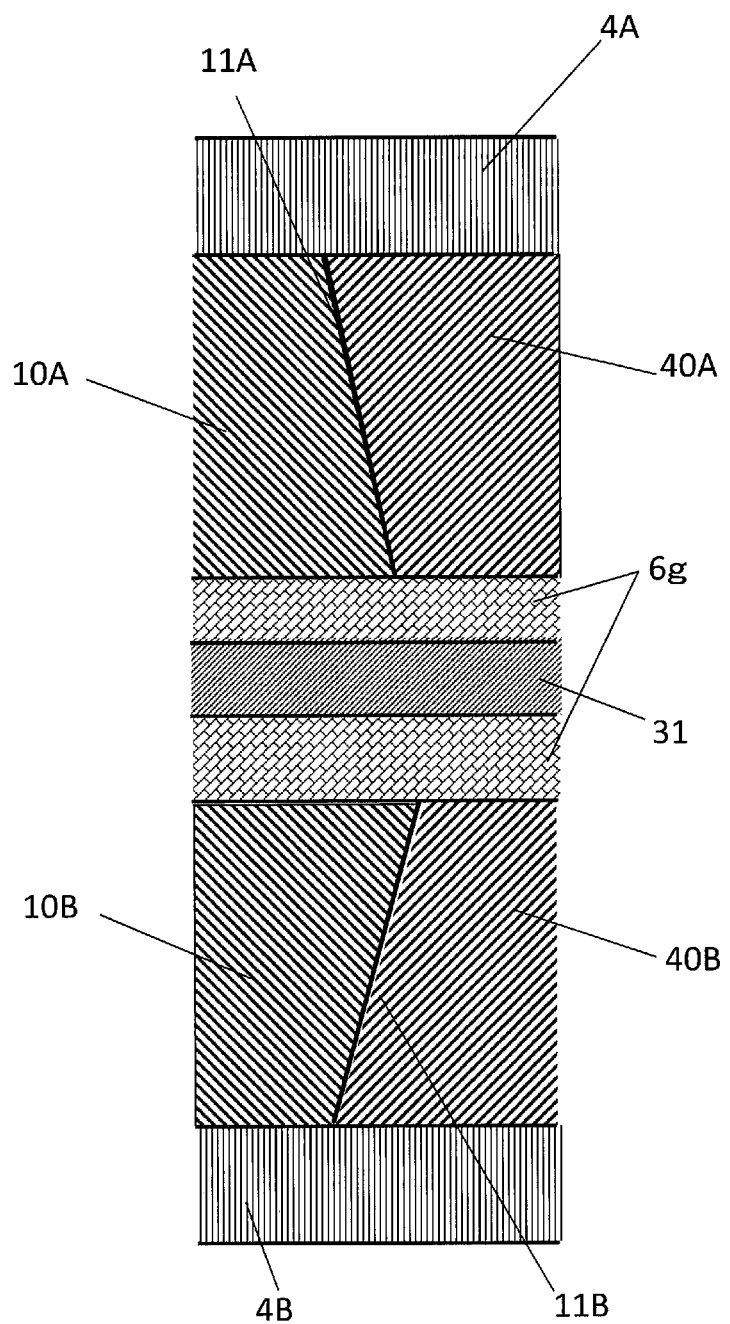
FIG. 7B is an enlarged cross-section of an inner surface of a seal member in a fuel cell according to the fourth embodiment of the disclosure.

FIG. 7B shows a case in which the fuel-side gas-diffusion layer 40A pushes the fuel-side seal member 10A above the minimum level.

The inner surface 11A of the fuel-side seal member is inclined against the electrolyte membrane 31 or the frame 6.

Compared to the case in which the inner surface 11A is vertical to the electrolyte membrane 31 or the frame 6, the contact area is increased, and thus, the fuel-side gas-diffusion layer 40A and the fuel-side seal member 10A are rigidly appressed against one another when the inner surface 11A is inclined against the electrolyte membrane 31 or the frame 6.

With regard to the inclination direction, the fuel-side gas-diffusion layer 40A more deeply penetrates into the fuel-side seal member 10A at the side where the separator 4A is present.

Figure 7C:
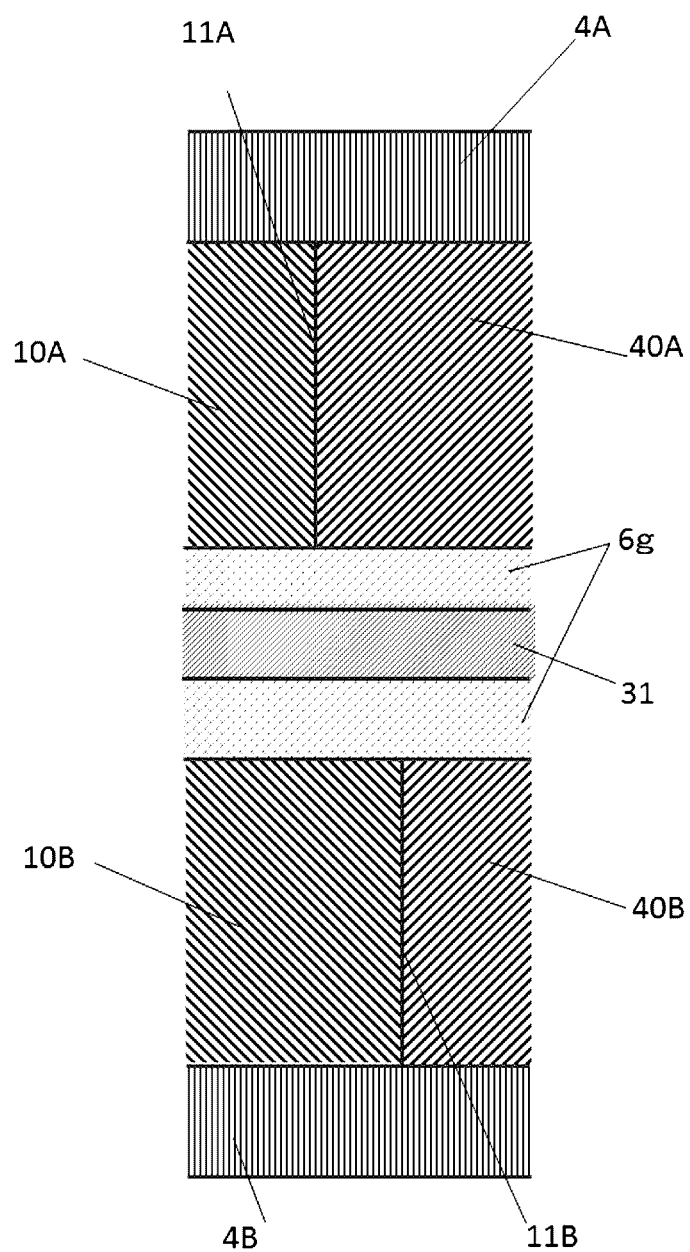
FIG. 7C is an enlarged cross-section of an inner surface of a seal member in a fuel cell according to the fourth embodiment of the disclosure.

FIG. 7C shows a case in which the fuel-side gas-diffusion layer 40A pushes the fuel-side seal member 10A, and the oxidant-side gas-diffusion layer 40B pushes the oxidant-side seal member 10B, to the minimum level.

The level (position) of the inner surface 11A of the fuel-side seal member differs from the level (position) of the inner surface 11B of the oxidant-side seal member.

This is because, for example, the respective pushing forces may be different from one another, or there may be influences of gravity.

Since the levels (positions) are not symmetric, the loads will not focus on certain points.

Both of the inner surfaces will have the same level of adhesion.

Figure 7D:
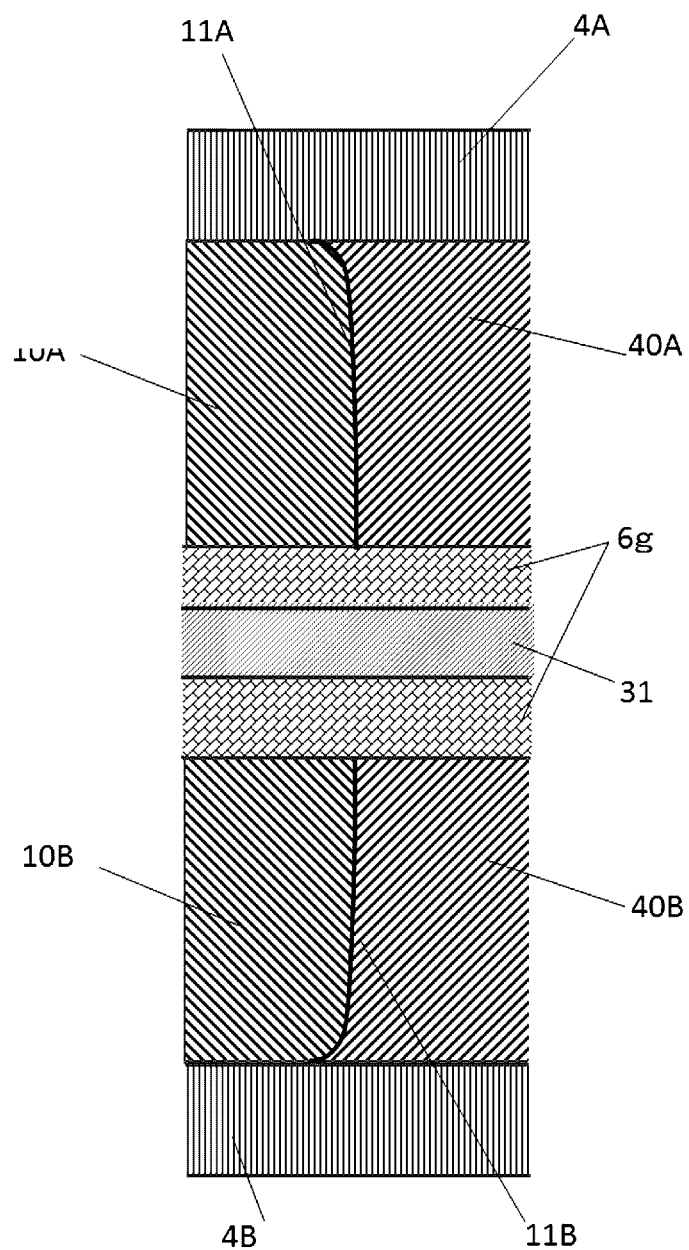
FIG. 7D is an enlarged cross-section of an inner surface of a seal member in a fuel cell according to the fourth embodiment of the disclosure.

FIG. 7D shows a case in which the fuel-side gas-diffusion layer 40A pushes the fuel-side seal member 10A above the minimum level.

A corner of the fuel-side seal member 10A located around the outer edge of the inner surface 11A is round.

At the above corner, the fuel-side gas-diffusion layer 40A projects to the side where the fuel-side seal member 10A is present.

In that case, on the inner surface 11A of the fuel-side seal member 10A, the contact area will be increased, and the fuel-side gas-diffusion layer 40A and the fuel-side seal member 10A are more tightly adhered to one another.

Figure 7E:
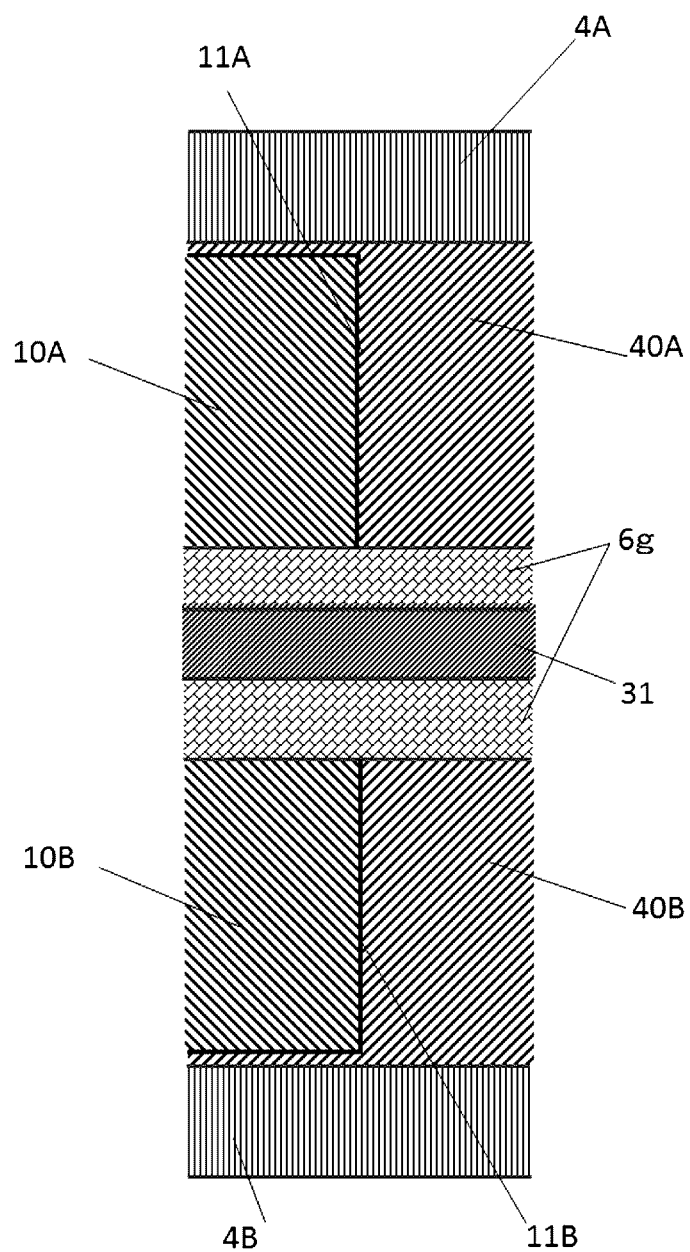
FIG. 7E is an enlarged cross-section of an inner surface of a seal member in a fuel cell according to the fourth embodiment of the disclosure.
Figure 8:
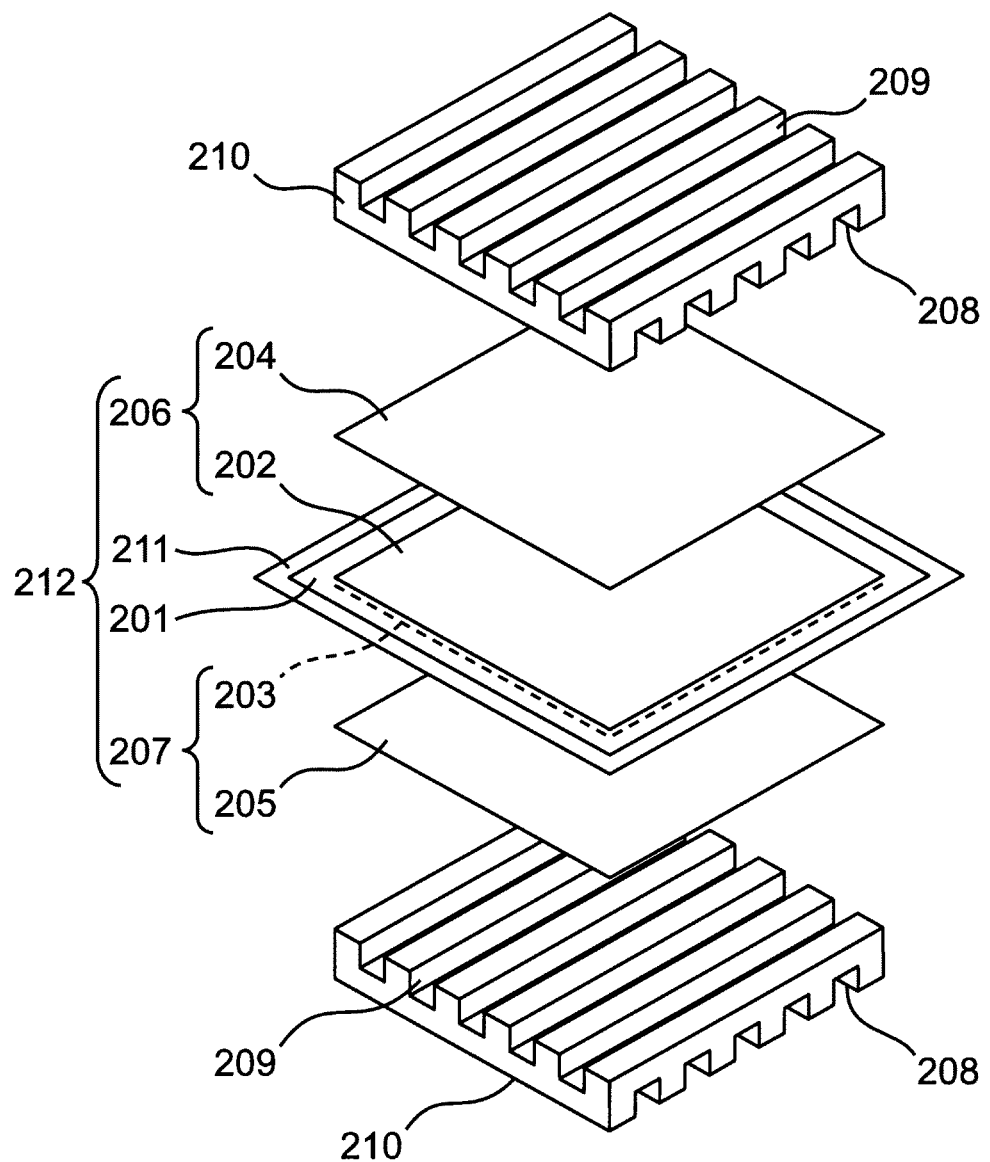
FIG. 8 is an exploded perspective view that shows a basic structure of a unit cell that is one form of a convention fuel cell.
Figure 9:
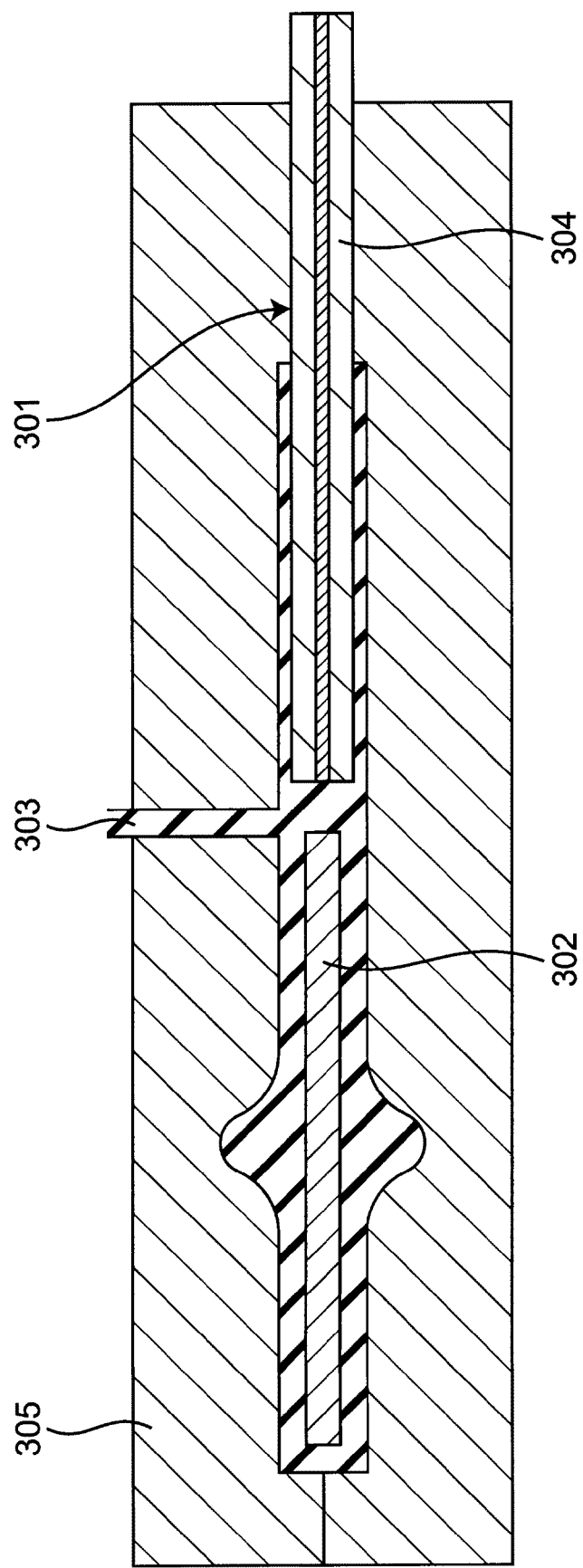
FIG. 9 is a diagram that shows a conventional MEA.
Figure 10:
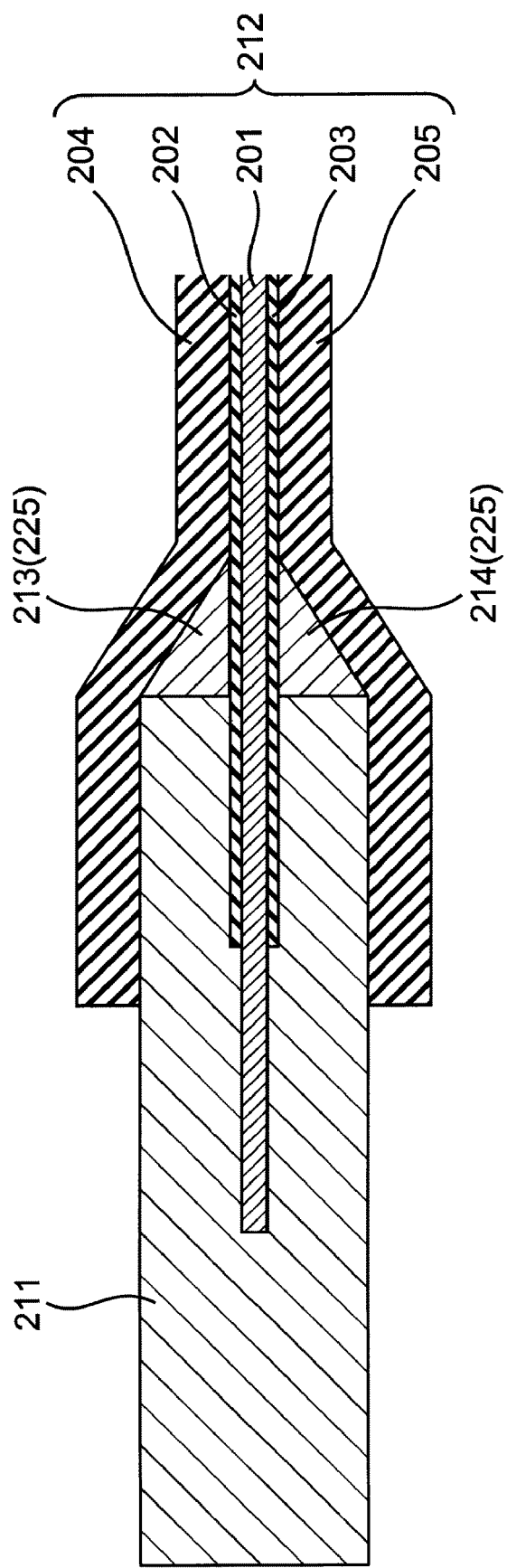
FIG. 10 is a diagram that shows a conventional MEA.

FIG. 7E shows a case in which the fuel-side gas-diffusion layer 40A pushes the fuel-side seal member 10A above the minimum level.

Apart of the fuel-side gas-diffusion layer 40A is distributed on an upper surface of the fuel-side seal member 10A, i.e., the surface adjacent to the separator 4A, and thus, a part of the inner surface 11A of the fuel-side seal member 10A faces the separator 4A across the part of the fuel-side gas-diffusion layer 40A.

In that case, the contact area over the inner surface of the fuel-side seal member 10A will be increased, and thus, the fuel-side gas-diffusion layer 40A and the fuel-side seal member 10A will more rigidly or tightly adhered to one another.

Additionally, in this embodiment, the fuel-side is described above with reference to FIGS. 7A, 7B, 7D and 7E. The same shall apply to a structure of the fuel cell at the oxidant-side.

The structures described in FIGS. 7A, 7B, 7D and 7E can be combined for the fuel-side and the oxidant-side.

By adopting the structure described in FIGS. 7B to 7E, fuel cells having higher degrees of adhesion of the internal members can be realized, compared with the structure described in FIG. 7A.

In addition, some of the above various embodiments/variations can appropriately be combined so as to achieve the respective advantages or effects brought about by the selected embodiments/variations.

Furthermore, not only combinations of embodiments or examples, and combinations of embodiments and examples are possible, but also combinations of certain features/elements found in different embodiments and examples are possible.

Polymer electrolyte fuel cells according to the disclosure are applicable as power supplies, particularly for various types of commercially or industrially applicable products and equipment (e.g., household cogeneration systems, vehicles). They can also be employed as portable power supplies. Furthermore, production methods according to the disclosure can be employed in various types of manufacturing industries associated with power supplies, batteries, and the above-mentioned products and equipment.

What is claimed is:

1. A fuel cell, comprising:
   (i) an electrolyte membrane;
   (ii) a fuel-side catalyst layer placed on one surface of the electrolyte membrane;
   (iii) an oxidant-side catalyst layer placed on another surface of the electrolyte membrane;
   (iv) a fuel-side gas-diffusion layer placed on a main surface of the fuel-side catalyst layer;
   (v) an oxidant-side gas-diffusion layer placed on a main surface of the oxidant-side catalyst layer;
   (vi) a pair of separators that hold the fuel-side gas-diffusion layer and the oxidant-side gas-diffusion layer therebetween;
   (vii) a frame that surrounds outer peripheries of the electrolyte membrane, the fuel-side catalyst layer and the oxidant-side catalyst layer;
   (viii) a fuel-side seal member placed on a main surface of the fuel-side gas-diffusion layer; and
   (ix) an oxidant-side seal member placed on a main surface of the oxidant-side gas-diffusion layer,
   wherein the fuel-side gas-diffusion layer and the oxidant-side gas-diffusion layer cover an inner edge of the frame, and are adhered tightly onto the fuel-side seal member and the oxidant-side seal member, respectively, such that no spaces are provided between the fuel-side gas-diffusion layer and the fuel-side catalyst layer, and between the oxidant-side gas-diffusion layer and the oxidant-side catalyst layer,
   and wherein an interface between the fuel-side seal member and the fuel-side gas-diffusion layer is located on a surface of the frame, the frame has a rectangular cross-section, and an end portion of the frame directly sandwiches a laminate of the electrolyte membrane, the fuel-side catalyst layer and the oxidant-side catalyst layer from both sides in a thickness direction of the electrolyte membrane.

2. The fuel cell according to claim 1, wherein a mean thickness of the fuel-side gas-diffusion layer is larger than a mean thickness of the inner edge of the frame, and a mean thickness of the oxidant-side gas-diffusion layer is larger than a mean thickness of the inner edge of the frame.

3. The fuel cell according to claim 1, wherein the interface between the fuel-side seal member and the fuel-side gas diffusion layer is inclined against the frame or the electrolyte membrane at an acute angle when viewed from the outer periphery, and the fuel-side gas-diffusion layer penetrates into the fuel-side seal member so as to be inclined.

4. The fuel cell according to claim 1,
   wherein, at the interface between the fuel-side seal member and the fuel-side gas-diffusion layer, the fuel-side gas-diffusion layer penetrates into a part of the fuel-side seal member, and a portion of the fuel-side gas-diffusion layer which penetrates into the fuel-side seal member is adjacent to one of the separators.

5. The fuel cell according to claim 1,
   wherein, along the interface between the fuel-side seal member and the fuel-side gas-diffusion layer, the fuel-side gas-diffusion layer penetrates into an area between the fuel-side seal member and one of the separators that is adjacent to the fuel-side gas-diffusion layer.

6. The fuel cell according to claim 1,
   wherein at least one part of the interface between the fuel-side seal member and the fuel-side gas-diffusion layer, and at least one part of an interface between the oxidant-side seal member and the oxidant-side gas-diffusion layer are laterally offset from each other along the frame or the electrolyte membrane.

7. The fuel cell according to claim 4, wherein the fuel-side gas-diffusion layer penetrates farthest into the part of the fuel-side seal member at the portion of the fuel-side gas-diffusion layer which is adjacent to one of the separators.

8. The fuel cell according to claim 6, wherein the interface between the fuel-side seal member and the fuel-side gas-diffusion layer and the interface between the oxidant-side seal member and the oxidant-side gas-diffusion layer are arranged at asymmetric locations.

9. The fuel cell according to claim 1, wherein the frame has a thickness which is smaller than that of the fuel-side gas diffusion layer and that of the oxidant-side gas diffusion layer.

10. The fuel cell according to claim 1, wherein the fuel-side seal member is in contact with the fuel-side gas diffusion layer and completely fills a space between the fuel-side gas diffusion layer and an outer peripheral surface of the fuel cell.

11. The fuel cell according to claim 1, wherein the interface is one flat plane, and the interface is inclined with respect to the frame or the electrolyte membrane at an acute angle when viewed from the outer periphery.

12. A method for producing a fuel cell according to claim 1, comprising:
(i) providing a layer structure including an electrolyte membrane, a fuel-side catalyst layer that is located on one main surface of the electrolyte membrane, and an oxidant-side catalyst layer that is located on another main surface of the electrolyte membrane;
(ii) providing a frame so as to surround outer peripheries of the fuel-side catalyst layer and the oxidant-side catalyst layer;
(iii) providing a fuel-side seal member on one main surface of the frame adjacent to the fuel-side catalyst layer, and providing an oxidant-side seal member on one main surface of the frame adjacent to the oxidant-side catalyst layer;
(iv) providing a fuel-side gas-diffusion layer on one main surface of the fuel-side catalyst layer, and providing an oxidant-side gas-diffusion layer on one main surface of the oxidant-side catalyst layer;
(v) providing a pair of the separators, such that one of the separators is placed on another main surface of the fuel-side gas-diffusion layer, and the other separator is placed on another main surface of the oxidant-side gas-diffusion layer;
(vi) applying a predetermined pressure to the pair of separators, such that the fuel-side gas-diffusion layer and the oxidant-side gas-diffusion layer are deformed so as to cover an inner edge of the frame, thereby causing the fuel-side gas-diffusion layer and the oxidant-side gas-diffusion layer to adhere tightly to the frame;
(vii) further causing the fuel-side gas-diffusion layer and the oxidant-side gas-diffusion layer to the fuel-side seal member and the oxidant-side seal member, such that no spaces are provided between the fuel-side gas-diffusion layer and the fuel-side catalyst layer, and between the oxidant-side gas-diffusion layer and the oxidant-side catalyst layer.

* * * * *